United States Patent [19]
Chor et al.

[11] Patent Number: 5,855,018
[45] Date of Patent: Dec. 29, 1998

[54] PRIVATE INFORMATION RETRIEVAL

[75] Inventors: Ben-Zion Chor; Oded Goldreich, both of Tel-Aviv; Eyal Kushilevitz, Haifa, all of Israel

[73] Assignee: Yeda Research and Development Co. Ltd., Rehovot, Israel

[21] Appl. No.: 733,994

[22] Filed: Oct. 18, 1996

Related U.S. Application Data

[60] Provisional application No. 60/005,719 Oct. 20, 1995.
[51] Int. Cl.$^6$ ..................................................... G06F 17/30
[52] U.S. Cl. ..................................... 707/9; 707/10; 380/4; 380/25; 380/49
[58] Field of Search ........................... 707/9, 10; 380/4, 380/25, 49

[56] References Cited

U.S. PATENT DOCUMENTS

| | | | |
|---|---|---|---|
| 5,123,045 | 6/1992 | Ostrovsku et al. | 380/4 |
| 5,436,972 | 7/1995 | Fischer | 380/25 |
| 5,530,758 | 6/1996 | Marino, Jr. et al. | 380/49 |
| 5,614,927 | 3/1997 | Gifford et al. | 707/101 |
| 5,630,079 | 5/1997 | McLaughlin | 345/335 |

OTHER PUBLICATIONS

B. Chor, et al., Private Information Retrieval, Annual Symposium on Foundations of Computer Science, 1995, vol. 36, pp.:41–50, Oct., 1995.

A.J. Menezes, et al., Advances in Cryptology –CRYPTO '90 Proceedings, Springer–Verlag, pp. 63–76.

R.L. Rivest, et al., Foundations of Secure Computation, Academic Press, Inc., N.Y. San Francisco London, pp. 169 –179, (1978).

F. Chin, Security Problems on Inference Control for SUM, MAX, and MIN Queries, Journal of the Association for Computing Machinery, vol. 33, No. 3, Jul. 1986, pp. 451–464.

M. Abadi, et al., On Hiding Information from an Oracle, Journal of Computer and System Sciences, 39, pp. 21–50, (1989).

D.E.R. Denning, Cryptography and Data Security, Addison-–Wesley Publishing Company, pp. 331–340.

N.R. Adam, et al., Security–Control Methods for Statistical Databases: A Comparative Study, ACM Computing Surveys, vol. 21, No. 4, pp. 515–556; Dec. 1989.

P. Tendick, et al., A Modified Random Perturbation Method for Database Security, ACM Transactions on Database Systems, vol. 19, No. 1, pp. 47–63, Mar. 1994.

P. Pudlák, et al., Modified Ranks of Tensors and the Size of Circuits, ACM Press, pp. 523–531.

D. Beaver, et al., Hiding Instances in Multioracle Queries, Springer–Verlag, pp. 37–48.

J.D. Ullman, Principles of Database Systems, Computer Science Press, pp. 359–365.

O. Goldreich, Foundations of Cryptography (Fragments of a Book), Weizmann Institute of Science, pp. 85–91, Feb. 23, 1995.

D. Dobkin, et al., Secure Databases: Protection Against User Influence, ACM Transactions on Database Systems, vol. 4, No. 1, pp. 97–106, Mar. 1978.

*Primary Examiner*—Wayne Amsbury
*Attorney, Agent, or Firm*—Sprung Kramer Schaefer & Briscoe

[57] ABSTRACT

Method for retrieving data from a database, while assuring privacy, which comprises providing a database address for the data sought to be retrieved, generating at least two messages and communicating them to two or more database copies, generating two replies from the database copies, wherein one or more of said messages depends on the database address, a pseudo random or random number and wherein each reply depends on the message transmitted to the specific database copy, and the retrieved data is calculated as a function of said replies.

18 Claims, 10 Drawing Sheets

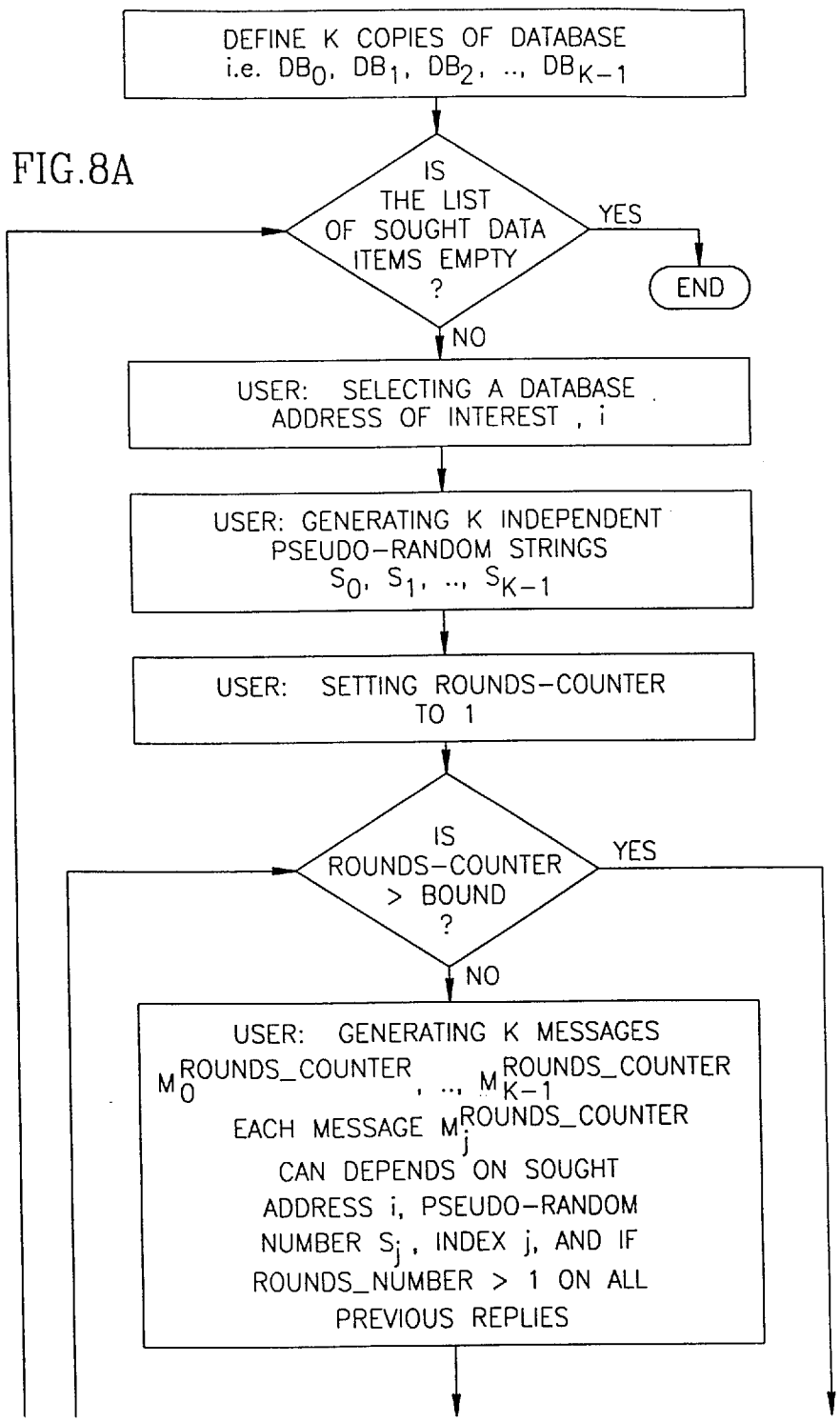

PRIVATE INFORMATION RETRIEVAL

This application claims the benefit of provisional application Ser. No. 60/005,719, filed Oct. 20, 1995.

FIELD OF THE INVENTION

The present invention is in the general field of information retrieval, and concerns, more specifically a novel technique for attaining private information retrieval from databases.

BACKGROUND OF THE INVENTION

In the context of user querying a database, a lot of research was devoted to methods that protect the database against a "curious" user. For example, methods that do not allow a user to ask queries in a statistical database in a way that enables him to reconstruct the value of particular entities, see e.g.

(i) N. Adam and J. Wortmann, "Security Control Methods for Statistical Databases: A Comparative Study. *ACM computing surveys,* 21(4):515–555, 1989.

(ii) F. Chin, Security Problems on Inference Control for SUM, MAX, and MIN Queries. JACM, 33(3) :451–464, 1986.

(iii) D. Denning. Cryptography and Data Security. Addison-Wesley, 1982.

(iv) D. Dobkin, A. K. Jones, and R. J. Lipton, Secure databases: Protection against user influence. *ACM Transactions on Database Systems,* 4(1):97–106, 1979.

(v) P. Tendick, and N. Matlof. A Modified Random Perturbation Method for Database Security. *ACM Transactions on Database Systems,* 19(1):47–63, 1994; and (vi) J. D. Ullman. Principles of Database Systems. Second edition, 1982, (section 10.5).

It may, thus, seem surprising that the issue of protecting the privacy of the user has not been discussed, as yet. For example, an investor that queries the stock-market database, for the value of a certain stock, may wish to keep private the identity of the stock he is interested in, or in other words to keep private the explicit database address that points to the data item of interest.

To the extent that the contents of the database may allude on the query it is also desirable to keep private the sought data item itself. Thus, reverting to the previous example, it may be desirable to keep private both the name of the stock that the investor queries about (which, in this particular example, stands for the sought database item's address), and the value thereof (which, in this particular example, stands for the sought database item). In this connection it should be borne in mind that if the database operator is unable to reveal the stock name but is nevertheless able of revealing the value thereof, the accomplished level of privacy is adversely affected, since naturally from the revealed value one can possibly identify the stock in question.

It should be noted that the information should be kept secret vis a vis the database operator in order to assure that the database operator is unable to decode the query. Of course, it is also required to accomplish protection against an eavesdropper that intercepts messages (i.e. the specified query) transmitted from the user to the database site over communication medium but the latter problem may be coped with by utilizing conventional and known per se encryption techniques.

A trivial way to accomplish privacy, insofar as one database is concerned, is simply to ask for a copy of the whole database. The drawbacks associates with this solution are self explanatory.

Private Information Retrieval (PIR) solves a problem that arises in real world applications, where searching for data in public databases might reveal sensitive business information. The problem has not been addressed before in the literature. There have been some works which developed techniques which, in hindsight, can be used in the context of PIR. It should be, nevertheless, emphasized that the latter works solve theoretical problems of different nature and have not considered, even remotely, the database question of PIR in particular. Moreover, even, if for sake of discussion only, these solutions are analyzed in the context of PIR, one may derive from these techniques substantially inferior results to those achieved in accordance with the present invention, as described below.

Thus, in P. Pudlak and V. Rodl, "Modified Ranks of Tensors and the Size of Circuits", STOC, 1993, the following theoretic question is studied. There are three players: $D_1$ that holds a string x and an index j, $D_2$ that holds the same string x and an index l, and U that knows both j and l. The goal is for $D_1$ and $D_2$ to send a single message each to U so that he will be able to compute the bit $x_{j+l \, mod \, n}$. They show that this can be done using o(n) bits (more precisely, O(n $\log_2 \log_2 n/\log_2 n$)). Applying, for sake of discussion, their solution to a PIR application, which, as was specified in the foregoing, had not been suggested even remotely in the P. Pudlak and V. Rodl publication, yields substantially inferior results to those of the present application.

More specifically, a two database PIR scheme can be constructed, utilizing the P. Pudlak and V. Rodl technique, in the following manner:

The user chooses uniformly at random a pair of indices j, l such that j+l=i mod n. He sends j to the first database, l to the second and the three of them execute the protocol. This solves the problem with o(n) bits while maintaining privacy.

The instance hiding problem is introduced and studied in the following publications:

(i) R. L. Rivest, L. Adelman, and M. L. Dertouzos. "On data banks and privacy homomorphisms, Foundations of Secure Computation (eds., R. DeMillo, D. Dobkin, A. Jones and R. Lipton). Academic Press, 1978;

(ii) Abadi M., J. Feigenbaum, and J. Kilian, "On Hiding Information from an Oracle", JCSS, 39(1):21–50, 1989;

(iii) D. Beaver and J. Feigenbaum. Hiding Instances in Multioracle Queries. STACS 1990.

(iv) D. Beaver, J. Feigenbaum, J. Kilian and P. Rogaway. Security with Low Communication Overhead. CRYPTO, 1990.

In the instance hiding problem, a computationally bounded player U that holds an instance i wishes to compute a known function f on input i. The function f may be hard to compute, so U can query k computationally unbounded oracles to achieve this task (each oracle can compute f(j) for any j). The goal of the player is to keep its instance i hidden from the oracles. As before, the issue of PIR had not been discussed, even remotely.

In this connection it should be emphasized that the goal of computing a hard but known function (in the instance hiding problem) is completely different from retrieving an item from a database with unknown contents (in PIR). Thus, whilst in the PIR context, databases of sizes between $n=2^{25}$ to $n=2^{45}$ are relevant, computing a known function on argument of 25 to 45 bits, in accordance with the instance hiding technique, is a relatively easy task computationally (in particular, the whole function can be stored in a table so a table look-up can be used). Thus, for the range of sizes where PIR has practical importance, the instance hiding problem has no relevance, whatsoever.

Bearing this in mind, the application of the instance hiding technique to the PIR application will now be analyzed, for sake of discussion only. Thus, the relevant instant hiding technique is the use of low degree polynomials, introduced by Beaver and Feigenbaum ibid. and further developed by Beaver, Feigenbaum, Kilian and Rogaway ibid. From the construction in Beaver, Feigenbaum, Kilian and Rogaway ibid, it is possible to derive a private information retrieval scheme for k (constant) databases with $O(n^{1/(k-1)})$ communications (see Remark 5.2, in the latter reference), and in addition requires implementing known per se finite field arithmetic, which is more costly operation than the xor operation used in several of the possible embodiments of the invention.

For k=2, the techniques of D. Beaver, J. Feigenbaum, J. Kilian and P. Rogaway ibid. are effectively inapplicable, as they would require communicating the whole database. For k=4 these techniques be used to yield $O(n^{1/3})$ communications solution, which is substantially inferior to our solution.

The important issue of amortizing the complexity when larger blocks of information are retrieved is not addressed at all in the instance hiding context.

It is accordingly the object of the present invention to provide a system and method for privately retrieving of data from database(s).

The present invention fulfills, thus, a long felt need.

SUMMARY OF THE INVENTION

The present invention exploits the rapid development of distributed databases and all kind of data-services, e.g. the so called "information highways", and the fact that the same database is, frequently, replicated in several sites. This makes it possible to cope with the inherent difficulty of achieving privacy in the single database scenario.

Thus, in accordance with the invention, queries are applied to k (k≥2) copies of database such that from the communication exchanged with each copy, the user can obtain the desired data item. Each individual database's operator gets no partial information (and, a fortiori, no full information) on both the address of the sought data item and on the data item itself, based on the exchanged communication between the user and the respective database copy. Exchanged communication includes all the messages transmitted from the user to the respective database, and all of the replies received from the respective database copy.

Obviously, if no partial information is gained from all the messages and the replies it cannot be gained from portions thereof (e.g. on the basis of solely some of the transmitted messages).

Formally, privacy may be defined as:

PRIVACY: For every database $DB_j$, for every possible content of the database, x, and any two indices i and j, the database operator will not be able to distinguish between the case that the user is interested in the $i^{th}$ data item in said x or the $j^{th}$ data item in said x, based on the communication that is exchanged between the user and said $DB_j$.

Thus, by way of example, if the sought data item is 'y' (l-bit-long) the database operator will have no information (or partial information) on neither the data item itself (i.e. 'y') nor on the address thereof. Partial information being, e.g. the first m (m<l) bits of the sought data item or the first bits of the address thereof.

As will be evident from the description below, during normal course of operation the user provides to each one of the database copies, portions of or even the entire address of the sought data item along with other, unrelated address or data.

Notwithstanding the above, the database operator is, effectively, incapable of revealing the specified database address (or portion thereof), since the database address of interest is only one of plurality of additional database addresses that are also applied to the database, thereby effectively rendering the database address of interest, indistinguishable from other unrelated addresses.

It should be noted that in the context of the invention privacy extends to any quantity that enables to derive the database address. Thus, for example, if data items are arranged in memory blocks with each block having a block address that is related to the addresses of the data records stored therein, the assertion that no partial information is gained with respect to the database address necessarily entails that no information is gained with respect to block address that stores, inter alia, the sought data item.

It should be further noted that in the context of the invention, database addresses should be viewed in a broad sense as encompassing also a so called "higher level" representation thereof. Thus, in the previous example wherein an investor queries the stock-market database, for the value of a particular stock, e.g. "Microsoft", the latter is readily mappable to one or more specific database addresses in the low-level stock-market database. Clearly, neither the name "Microsoft", nor its associated database addresses(s) should be applied to the database (or to the database language that manipulates data in said database), in a manner that enables the database operator to reveal the sought data item.

To the extent that reduced level of privacy is tolerable, some strict requirements may be exempted. Thus, by way of example, instead of applying random numbers (in order to accomplish privacy in the sense described herein) pseudo random numbers may be applied in lieu of random numbers.

As will be evident from the description below, the operation of the system and method of the invention necessitates scanning of the entire contents of the database of interest. This characteristics may pose undue constraint insofar as the pertinent computational complexity is concerned and accordingly the complexity of computation may be decreased at the cost of adversely affecting the level of accomplished privacy, e.g. revealing explicitly an address of a block in which the sought data item resides, and applying the technique of the invention only with respect to this given block. Consequently the accomplished privacy in the sense described herein will extend merely to the specified block and not to the other blocks of the database whilst at the same time benefiting from improved computation complexity (since only the block under consideration will be scanned).

The latter examples demonstrate two out of many possible variants for adjusting the desired level of privacy. Thus, according to the invention, the desired level of privacy may vary all as required and appropriate depending on the particular application.

There is thus provided, a method for retrieving at least one sought l-bit-long (l≥1) data item from a database whilst essentially assuring the user's privacy; the database having k (k≥2) database copies designated as $DB_0$–$DB_{k-1}$ having respective k indices 0 . . . k-1; each of said database copies includes a plurality of l-bit-long data items associated, each, with a unique database address;;

the method comprising the following steps executed with respect to each one of said at least one sought l-bit-long data item:

(i) providing a database address of said sought l-bit-long data item;

(ii) generating k strings $S_0 \ldots S_{k-1}$, which when applied, each, to the respective databases $DB_0$ to $DB_{k-1}$, define in each one of them, a respective plurality of database addresses of a plurality of l-bit-long data items; the plurality of database addresses that is defined by each one of said $S_0 \ldots S_{k-1}$ containing a common subset and a complementary subset of database addresses; the respective complementary subsets of database addresses of $S_0$–$S_{k-1}$, being distinguishable, one with respect to the other, contingent upon the database address stipulated in step (i);

(iii) calculating for each database $DB_i$, from among said databases $DB_0 \ldots DB_{k-1}$, result$_i$ as a function of the plurality of l-bit-long data items of step (ii), giving rise to the generation of k results from $DB_0 \ldots DB_{k-1}$, respectively;

(iv) communicating the k results of (iii) to the user; and (v) the user calculating the sought l-bit-long item as a function of said k results.

$S_0$ may be generated in an essentially pseudo random manner, or if desired in a random manner, all as required and appropriate.

In the description and appended claims, roman numerals are used to designate method steps for convenience only. Accordingly, by way of example, they do not necessarily entail particular order of performing the steps, or by way of another example when a series of method steps are repeatedly applied with respect to two or more data items (e.g. the above steps (i)–(v)), this does not necessarily imply that they are applied serially, i.e. steps (i)–(v) for retrieving the first sought data item and thereafter steps (i)–(v) for retrieving the second sought data item etc. Thus, if desired, steps (i)–(v) may be applied to retrieve three sought data items simultaneously and then steps (i)–(v) are applied again to retrieve the fourth sought data item etc.

As will be explained in greater detail below "complementary subset" may be "positive" in the sense that it is "added" to the common subset, "negative" in the sense that it is removed from the common subset, or the empty subset, i.e. neither added nor removed from the common subset.

By a specific embodiment, (refereed to occasionally also as emulated database embodiment), k' databases (k'<k) from among said k databases are real and having respective k' indices, and a remaining k-k' databases from among said k databases are emulated; the k' databases are selected such that their respective k' indices are capable of covering the k indices of said k databases by utilizing a covering code technique.

In a specific realization of the emulated database embodiment, there is provided a method of the kind specified, wherein $DB_{i_0}$ substitutes said $DB_0$ and wherein string $S_0$, stipulated in said step (ii), is applied to $DB_{i_0}$ and wherein k' (k'<k) database copies ($DB_{i_0} \ldots DB_{i_{k'-1}}$) from among said k database copies, being real and are further having respective indices numbers $i_0 \ldots i_{k'-1}$; the indices numbers $i_0 \ldots i_{k'-1}$ are taken from the numbers 0 to k-1; the indices numbers $i_0 \ldots i_{k'-1}$, form collectively k' codewords for covering the k indices with Hamming distance 1, thereby enabling the database copies ($DB_{i_0} \ldots DB_{i_{k'-1}}$) to render a remaining k-k' database copies, from among said $DB_0$ to $DB_{k-1}$, emulated databases; and wherein said step (ii) is replaced by the following step:

(ii) generating k'-1 strings $S_1 \ldots S_{k'-1}$, which when applied to databases $DB_{i_1}$ to $DB_{i_{k'-1}}$, respectively, define in each one of them, a plurality of database addresses of a like number of plurality of l-bit-long data items; the set of plurality of database addresses that is defined by each one of said $S_0 \ldots S_{k'-1}$ containing a common subset and a complementary subset of database addresses; the respective complementary subset of database addresses of $S_0$–$S_{k'-1}$, being distinguishable, one with respect to the other, by a factor that is contingent upon the database address stipulated in step (i);

and wherein, said steps (iv) and (v) are replaced by the following steps (iv)–(vii):

(iv) calculating for each database $DB_{i_j}$, from among said databases $DB_{i_0} \ldots DB_{i_{k'-1}}$, a respective result$_j$ as a function of the plurality of l-bit-long data items of step (iii), giving rise to the generation of k' results from $DB_{i_0} \ldots DB_{i_{k'-1}}$, respectively;

(v) communicating the k' results of (iv) to the user;

(vi) each one of the k' databases $DB_{i_0} \ldots DB_{i_{k'-1}}$ emulating the reply of every database $DB_j$, from among said emulated databases, such that the index j thereof is of Hamming distance 1 with respect to the index of said one database; the reply of each emulated database $DB_j$, including repeatedly executing t times said step (iv), each time with respect to a different database address, thereby generating and transmitting to the user t results with respect to said $DB_j$; giving rise to the generation t results with respect to each one of the k-k' emulated databases;

(vii) communicating the t results with respect to each one of the k-k' emulated databases of (vi) to the user;

(viii) the user selecting, with respect to each one of said k-k' emulated $DB_j$, the correct result from among said t results, thereby obtaining k-k' results, which together with the k' results, stipulated in said step (iv), constitute k results; and (ix) the user calculating the sought l-bit-long item, as a function of said k results.

Regardless of whether or not the emulated database embodiment is concerned, $S_0$ may be generated in an essentially pseudo random manner, or if desired in a random manner, all as required and appropriate.

l may be any integer $\geq 1$.

Typically, but not necessarily, the result$_i$ being an l-bit long result$_i$.

By a specific embodiment, the respective database copies $DB_0$–$DB_{k-1}$ (or the storing, each, n l-bit-long data items, and are further organized, each, in d dimensions (d$\geq$1) each of which of size $n^{1/d}$.

Preferably, the result$_i$ is l-bit-long and is obtained by xoring bit-by-bit the plurality of l-bit-long data items that are defined by the plurality of database addresses applied to said $DB_i$, as stipulated in said step (ii), and the sought data item is obtained by xoring bit-by-bit said k l-bit-long results.

As will be explained in greater detail below, the invention provides for a so called "balancing technique".

Regardless of the embodiment under consideration, the balancing technique provides for a method of the kind specified herein, wherein the respective database copies $DB_0$ to $DB_{k-1}$ are storing, each, m different subunits; every subunit stores n/m l-bit-long data items;

the user queries the databases copies with respect to a single subunit of n/m l-bit-long data items, depending upon the specific embodiment;

each database copy calculates m replies from its respective m subunits, in a manner specified depending upon the specific embodiment;

each database sends said m replies to the user; and the user applies the calculation step, depending upon the specific embodiment, so as to retrieve at least m l-bit-long data items.

Insofar as the emulated database embodiment is concerned, by specific embodiment the result; stipulated in step (iv), being an l-bit-long result$_i$, and said t of step (vi) being $n^{1/d}$, where n being the number of database items and d being the number of dimensions that the database is arranged.

By still further specific embodiment, the l-bit-long result$_j$ is obtained by xoring bit-by-bit the plurality of l-bit-long data items that are defined by the plurality of database addresses applied to said $DB_{i_j}$ as stipulated in said step (iii), and wherein the sought data item is obtained by xoring bit-by-bit said k l-bit-long results.

Thus by specific embodiment, there is provided a method for retrieving at least one sought l-bit-long ($l \geq 1$) data item from a database whilst essentially assuring the user's privacy; the database having k ($k \geq 2$) database copies designated as $DB_0$–$DB_{k-1}$ having respective k indices 0 . . . k-1; each of said database copies includes a plurality of l-bit-long data items associated, each, with a unique database address; each one of said database copies is organized in d dimensions ($d \geq 1$) such that $2^d = k$ and wherein each l-bit-long data item, stored therein, is associated with a database address of d indices (index$_1$ . . . index$_d$);

the method comprising the following steps executed with respect to each one of said at least one sought l-bit-long data item:

(i) providing a d-indices ($i_1 \ldots i_d$) database address of said sought data item;

(ii) generating a string of d substrings $S_1^o \ldots S_d^o$ holding respectively a $1^{st}$ to $d^{th}$ sets of indices; said $1^{st}$ to $d^{th}$ sets of indices, when applied to $DB_0$, defining a plurality of database addresses of respective plurality of l-bit-long data items stored therein;

(iii) generating k-1 different strings having, respectively, string numbers 1 to k-1, wherein each string having d substrings $S_1^{o1} \ldots S_d^{od}$, such that o1, . . . od being a d-bit representation of the string number i of said string (i=1 . . . k-1); said d substrings $S_1^{o1} \ldots S_d^{od}$, of each string having string number i (i=1 . . . k-1) holding, respectively, a $1^{st}$ to $d^{th}$ sets of indices that when applied to $DB_i$, having the same index i (i=1 . . . k-1), define a plurality of database addresses of respective plurality of l-bit-long data items stored in said $DB_i$; each substring $S_j^{oj}$ from among said d substrings $S_1^{o1}, \ldots S_d^{od}$ (j=1 . . . d), has a value of either $S_j^0$ ($\sigma_j = 0$) or $S_j^1$ ($\sigma_j = 1$), wherein the former being the same as $S_j^o$ from among said $S_1^o \ldots S_d^o$ stipulated in step (ii), and the latter ($S_j^1$) equals to $S_j^o \oplus i_j$, wherein $i_j$ being an $j^{th}$ index taken from the d indices ($i_1 \ldots i_d$) of the database address stipulated in step (i);

(iv) for each database $DB_i$, from among said databases $DB_0$ to $DB_{k-1}$, xoring, bit-by-bit the plurality of l-bit-long data items that are defined by the like number of plurality of database addresses applied to said $DB_i$, as stipulated in said step (iii), so as to yield l-bit-long result$_i$, giving rise to the generation of k l-bit-long results from $DB_0$ to $DB_{k-1}$, respectively;

(v) communicating the k l-bit-long results to the user; and (vi) the user xoring bit-by-bit said k l-bit-long results thereby deriving said sought data item.

Each one of the substrings $S_1^o \ldots S_d^o$ may be generated in an essentially pseudo random manner, or random manner, depending on the desired level of privacy.

Turning now to the emulated version of the latter embodiment, there is provided a method for retrieving at least one sought l-bit-long data item from a database whilst essentially assuring the user's privacy; the database having k ($k \geq 2$) database copies designated as $DB0_0$–$DB_{k-1}$ having respective k indices 0 . . . k-1; each of said database copies includes a plurality of l-bit-long data items associated, each, with a unique database address; each one of said database copies is organized in d dimensions ($d \geq 1$) such that $2^d = k$ and wherein each l-bit-long data item, stored therein, is associated with a database address of d indices (index$_i$ . . . index$_d$); k'(k'<k) database copies ($DB_{i_0} \ldots DB_{i_{k'-1}}$), from among said k database copies, being real and are further having respective indices numbers $i_0 \ldots i_{k'-1}$; the indices numbers $i_0 \ldots i_{k'-1}$ taken from the numbers 0 to k-1; the indices numbers $i_0 \ldots i_{k'-1}$, form collectively k' codewords for covering k indices 0 . . . k-1, of d-bits each, with Hamming distance 1, thereby enabling ($DB_{i_0} \ldots DB_{i_{k'-1}}$) to emulate the remaining k-k' database copies, from among said $DB_0$ to $DB_{k-1}$;

the method comprising the following steps executed with respect to each one of said at least one sought l-bit-long data item:

(i) providing a d-indices ($i_1 \ldots i_d$) database address of said sought data item;

(ii) generating a string of d substrings $S_1^{o1} \ldots S_d^{od}$ holding respectively a $1^{st}$ to $d^{th}$ sets of indices; said $1^{st}$ to $d^{th}$ sets of indices, when applied to said $DB_{i_0}$, defining a plurality of database addresses of l-bit-long data items stored therein; o1' . . . od' being a d-bit representation of the string number $i_0$;

(iii) generating k'-1 (k'<k) different strings having, respectively, string numbers $i_1$ to $i_{k'-1}$ being identical to said indices numbers $i_1$ to $i_{k'-1}$, wherein each string having d substrings $S_1^{o1} \ldots S_d^{od}$, such that o1 . . . od being a d-bit representation of the string number $i_l$ of said string ($i_l = i_1 \ldots i_{k'-1}$); said d substrings $S_1^{o1} \ldots S_d^{od}$, of each string having string number $i_l (i_l = i_1, \ldots, i_{k'-1})$, holding respectively a $1^{st}$ to $d^{th}$ sets of indices that when applied to $DB_{i_l}$, having the same index i (i=1 . . . k-1), define a plurality of database addresses of data items stored in said $DB_{i_l}$; each substring $S_j^{oj}$ from among said d substrings $S_1^{o1} \ldots S_d^{od}$ (j=1 . . . d), has a value of either $S_j^{oj'}$ ($\sigma_j = \sigma_{j'}$) or $S_j^{oj'}$ ($\sigma_j \neq \sigma_{j'}$), wherein the former being the same as $S_j^{oj'}$ from among said $S_j^{o1'} \ldots S_d^{od'}$ stipulated in step (ii), and the latter ($S_j^{oj}$) being equal to $S_j^{oj'} \oplus i_j$, wherein $i_j$ being an $j^{th}$ index taken from the d indices ($i_1 \ldots i_d$) of the database address stipulated in step (i);

(iv) each database $DB_{i_l}$ from among said databases $DB_{i_0} \ldots DB_{i_{k'-1}}$, xoring bit-by-bit the plurality of l-bit-long data items that are defined by the like number of plurality of database addresses applied to said $DB_i$, as stipulated in said step (iii), so as to yield l-bit-long result$_i$; giving rise to the generation of k' l-bit-long results from $DB_{i_0} \ldots DB_{i_{k'-1}}$, respectively;

(v) communicating the k' l-bit-long results of (iv) to the user;

(vi) each one of the k' databases $DB_{i_0} \ldots DB_{i_{k'-1}}$ emulating the reply of every database $DB_j$, from among said emulated databases, such that the index j thereof is of Hamming distance 1 with respect to the index of said one database; the reply of each emulated database $DB_j$, including repeatedly executing $n^{1/d}$ times said step (iv), each time with respect to a different database address, thereby generating $n^{1/d}$ l-bit-long results with respect to said $DB_j$; giving rise to the generation of $n^{1/d}$ n-bit-long results with respect to each one of the k-k' emulated databases;

(vii) communicating the k' l-bit-long results of (vi) to the user;

(viii) for each one of said emulated k-k' $DB_j$, the user selecting the correct l-bit-long result, from among said $n^{1/d}$ l-bit-long results, thereby obtaining k-k' l-bit-long results, which together with the k' l-bit-long results, stipulated in said step (iv), constitute k l-bit-long results; and (ix) the user xoring bit-by-bit said k l-bit-long results thereby deriving the sought data item.

By a specific embodiment, said index $i_0$ being 0, and wherein the string $S_1^{o1'} \ldots S_d^{od'}$ equals $S_1^0 \ldots S_d^0$.

Each one of the d substrings $S_1^{o1'} \ldots S_d^{od'}$ may be generated in an essentially pseudo random manner, or random manner, depending on the desired level of privacy.

l may be any integer $\geq 1$.

Typical, yet not exclusive embodiments employ d=1 and k=2; d=2 and k=4; d=3 and k'=2; d=4 and k'=4; k=2 and d=1 and $m=n^{1/2}$; k=4 and d=2 and $m=n^{1/3}$; k=2 and d=1 and $m=n^{1/2}$ and l=m; k=4 and d=2 and $m=n^{1/3}$ and l=m.

If desired, in the various embodiments of the inventions, as described herein, the bi-directional communication between the user and the databases is encrypted.

It should be noted that regardless of the embodiment of the invention under consideration, the bi-directional communication between the database is not necessarily confined to one round (i.e. the user queries and the database replies), but rather two or more rounds may be utilized, all as required and appropriate depending upon the particular application.

The invention as defined below (hereinafter general definition), is very broad in the sense that it encompasses wide range of applications including those described in the foregoing.

There is thus provided in accordance with the invention, a method for retrieving at least one sought data item from a database whilst essentially assuring the user's privacy;

the database having k (k $\geq$ 2) database copies designated as $DB_0$–$DB_{K-1}$ having respective k indices 0 . . . k-1;

the method comprising the following steps executed with respect to each one of said at least one sought data item:

(i) the user providing a database address of the sought l-bit-long data item;

(ii) the user generating at least two messages and communicating the messages to respective at least two database copies from among said $DB_0$–$DB_{k-1}$;

(iii) the at least two database copies generating at least two respective replies, and communicating the at least two replies to the user;

wherein:

at least one of said messages depends on at least the following parameters (a) and (b):

(a) the database address stipulated in step (i), and (b) a pseudo random or random number; and at least one of said messages depends on at least (c) a pseudo random or random number;

and wherein:

each reply, from among said at least two replies, that is communicated from the respective database copy depends at least on the message communicated to said at respective database copy; and (iv) the user calculating the sought data item as a function of at least:

(d) the at least two respective replies stipulated in said step (iii).

The use of "depend" in the specified general definition does not necessarily imply that the dependency is on the specified quantity "as such", but rather it may depend on a portion thereof, derivative thereof etc. Thus, by way of non limiting example, the message may depend on the "database address stipulated in step (i)", as such, or on portion thereof (e.g. the first bits thereof), or on a derivative thereof (e.g. the xor of the bits) etc.

Despite the fact that at least one of said messages depends on the database address stipulated in step (i), as will be illustrated in the example below, this does not contradict the definition of privacy.

It should be noted that the specified general definition poses no constraints on the number of rounds the method steps include and the number of messages (or reply) in each round. Thus, by way of non limiting example, the two messages may be sent in one round (to two database copies respectively), or if desired one message is sent to one database copy and upon receiving the reply the second message is sent to another database copy and upon receiving the reply the user can calculate the sought data item on the basis of both replies.

Obviously, the latter definition includes a one-round scenario in which k messages are transmitted to the respective k database copies and k replies are communicated from the respective k database copies. One or more of said k messages have the specified (a) and (b) characteristics (and if desired it may be depended also on other quantities as will be explained in greater detail below). In the latter scenario, k replies are communicated from the respective k database copies to the user and at least two of them comply with the specified (c) constraint (and possibly depend also on other quantities). Whilst the latter scenario exhibits one round, it may likewise extend to two or more rounds, mutatis mutandis.

The example above illustrate some out of many possible embodiments which are embraced by the specified general definition.

The various embodiments referred to with respect to previous method steps apply to, and are embraced by, the specified general definition, e.g. the utilization of k' real database copies from among said k database copies that are capable of emulating the remaining k-k' database copies by utilizing the covering code technique, applying the balancing technique whenever required, utilizing xor (or other function), all as required and appropriate and other variations.

By one embodiment of the general definition there is provided a method for retrieving at least one sought data item from a database whilst essentially assuring the user's privacy;

the database having k (k $\geq$ 2) database copies designated as $DB_0$–$DB_{k-1}$ having respective k indices 0 . . . k-1;

the method comprising the following steps executed with respect to each one of said at least one sought data item:

(i) the user providing a database address of the sought l-bit-long data item;

(ii) the user generating k messages and communicating them to said $DB_0$–$DB_{k-1}$, respectively; each one of said k messages depends on at least a respective message parameter; the message parameter of each one of said k messages including one or more of the following: the database address stipulated in step (i), a pseudo-random or random number, the index of the database copy, from among said $DB_0$–$DB_{k-1}$ database copies, that receives the message, and a round number;

(iii) each one of said k databases, generating a reply depending on at least a respective reply parameter; the reply parameter of each one of said replies including one or more of the following: the message received in said step (ii), the contents of the database, the index of the database that originates the message, and said round number;

(iv) repeatedly executing said steps (ii) and (iii) for a number of times as prescribed by said round number; the message parameter of later messages including one or more of the following: the database address stipulated in step (i), a pseudo-random or random number, the index of the database that receives the message, said round number and one or more previous replies; the reply parameter of later replies including one or more of the following: the contents of the database, the index of the database that originates the message, said round number, and on one or more previous messages of the same database; and (v) the user calculating the sought data item as a function of at least a result argument; the result argument including one or more of the following: at least one message of the messages stipulated in steps (ii) and (iv), at least one reply stipulated in step (iii) and (iv), said pseudo-random number.

The use of the term "Index" is not necessarily confined to the literal meaning of an index but rather is directed to any quantity or attribute that distinguishes the specifies database copy.

The use of "message parameter" and "reply parameter" is for sake of convenience only and it does not signify a real quantity.

The use of "depend" in the specified general definition does not necessarily imply that the dependency is on the specified quantity "as such", but rather it may depend on a portion thereof, derivative thereof etc. Thus, by way of non limiting example, the message parameter may depend on the "database address stipulated in step (i)", as such, or on portion thereof (e.g. the first bits thereof), or on a derivative thereof (e.g. the xor of the bits) etc.

The latter assertion likewise applies to the "reply parameter", e.g. it depends on the "database contents" (i.e. the entire database), or a given portion of the database contents etc.

The same holds true with respect to message parameter of later messages and to reply parameter of later replies.

Those versed in the art will readily understand that if the round bound is set to 1 then step (ii) and (iii) are executed only once and there is no necessity to execute step (iv).

The use of "later messages" signify messages that are sent in later rounds, i.e. message sent in second round is later than message sent of first round.

The same applies to later replies, and to previous messages and previous replies mutatis mutandis.

The invention further provides for a system for retrieving at least one sought l-bit-long ($l \geq 1$) data item from a database whilst essentially assuring the user's privacy;

the database having k ($k \geq 2$) database copies designated as $DB0_0$–$DB_{k-1}$ having respective k indices 0 . . . k-1; each of said database copies includes a plurality of l-bit-long data items associated, each, with a unique database address;

the system comprising a user station, linked to a communication channel, which includes in combination:

(i) storage medium for storing a database address of said sought l-bit-long data item;

(ii) string generator for generating k strings $S_0 \ldots S_{k-1}$, which when communicated and applied to databases copies $DB_0$ to $DB_{k-1}$, respectively, define in each one of them, a plurality of database addresses of a plurality of l-bit-long data items; the plurality of database addresses that is defined by each one of said $S_0 \ldots S_{k-1}$ containing a common subset and a complementary subset of database addresses; the respective complementary subsets of database addresses of $S_0$–$S_{k-1}$, being distinguishable, one with respect to the other, contingent upon the database address associated with said data item;

the system further comprising database processor that includes:

(i) calculator associated with each database $DB_i$ from among said databases $DB_0 \ldots DB_{k-1}$, for calculating a respective $result_i$ as a function of the plurality of said l-bit-long data items; said calculator is further capable of communicating k results from $DB_0 \ldots DB_{k-1}$, respectively; and in the user station, receiver for receiving said k results, and user calculator means associated with said receiver, for calculating the sought l-bit-long item as the function of said k results.

Said communication is normally effected over a communication channel that links the user station and the database processor.

The various modifications described with reference to the method apply, mutatis, mutandis also to the system described herein.

There is further provided a memory which contains a data for executing the steps of the various embodiments of the method described herein with respect to the user end.

There is further provided a memory which contains a data for executing the steps of the various embodiments of the method described herein with respect to the database end.

BRIEF DESCRIPTION OF THE DRAWINGS

For a better understanding, the invention will now be descried, by way of example only, with reference to the accompanying drawings, in which.

DESCRIPTION OF SPECIFIC EMBODIMENTS

Assuming, for sake of simplicity, that the database contents is an n-bit-long string x and that k ($k \geq 2$) identical copies of this database reside in respective k different sites (possibly, geographically remote sites). Assuming, further, that the user has some index i, and he is interested in obtaining the value of the bit $x_i$. In other words, the user is interested in a data item that is stored in a given database address. Various schemes that solve the retrieval problem with significantly smaller communication complexity than the obvious n-bit solution (i.e., asking for a copy of x), are presented. It should be noted that whilst in the specification reference is made to a user that queries a database, those versed in the art will readily appreciate that the system and method of the invention are not bound to a single user and are likewise adapted to operate in a multi-user environment.

In particular, there is shown a two-database scheme with communication complexity of $O(n^{1/3})$.

It should be further noted, that some of the schemes are based on exclusive-or queries; this type of queries can be easily derived from the sum operation, which is a primitive query implemented in several real-world databases, see for example F. Chin. ibid.; D. Dobkin, A. K. Jones, and R. J. Lipton ibid.; and J. D. Ullman ibid.

Yet another comment concerns the size of each data item. It is assumed that normally the records, stored in the database, have the same length l. Clearly, not all high level objects are necessarily of the same length. However, on the physical low level data items can be organized in fixed length units, e.g. computer words. It should be noted that those versed in the art that a mapping from high or intermediate level objects of varying length to a low level units of fixed length can be easily accomplished. In the case that the high level objects cannot be mapped to a whole number of low level units, the former can be, for example, padded with tailing zeros so as to accommodate a whole number of low level units. Accordingly, the present invention assures, inter alia, that high level object can be privately retrieved from a database by several low level retrievals, each of which, for retrieval low level data unit, i.e. an l-bit-long data item. Databases which store data in a form that is transformable to a plurality of l-bit-long data items are, of course, encompassed by the method and system of the invention.

Figure 1:
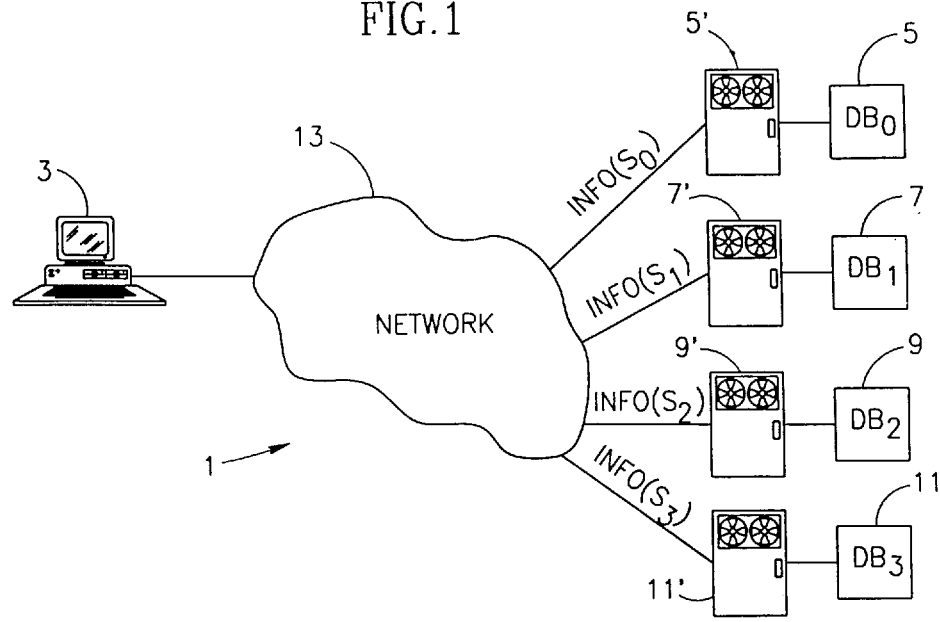
FIG. 1 is a generalized schematic illustration of a private information retrieval (PIR) system according to the invention.

Moving now to the drawings, attention is first directed to FIG. 1, showing a generalized schematic illustration of a private information retrieval (PIR) system according to the invention. Thus, the system 1, comprises, by this particular embodiment, a user station 3, and four copies of database designated as $DB_0$ to $DB_3$ respectively (5, 7, 9 and 11), each of which associated with distinct mainframe or server (5', 7', 9' and 11'), respectively. Database copies, in the context of the invention, should be interpreted in the broad sense, as encompassing not only one-to-one copies of the database, but also any arrangement that is transformable to a database copy, e.g. $DB_1$ holding the entire data items of $DB_0$, after having been subjected to the Boolean "complement" operation. Clearly in the latter example the contents of $DB_1$ can be readily transformed to match the contents of $DB_0$. If only a portion of a given database is of interest, the remaining portion thereof need not necessarily be reflected in the database copies. Thus, by way of non-limiting example, if a stock exchange database includes, except from the stocks' rates, a general information as regards the employees of the stock exchange institute, and there is an in-advance knowledge that this information is of no interest to the potential users, there is no reason to include the specified general information in the database copies which may be hence confined to merely the stocks' rates.

The mainframes are suitably programmed, each, for running a known, per se, data manipulation utility as well as the computational steps of the various embodiments of the invention for applying addresses to the databases, retrieving the corresponding data items and effecting the pertinent calculations as described herein. It should be noted that the hardware arrangement for attaining the latter goals is well known to those versed in the art and is therefore not expounded herein.

The user station (referred to occasionally also as "user") and the mainframes, are interlinked by means of conventional communication network 13.

Figure 2:
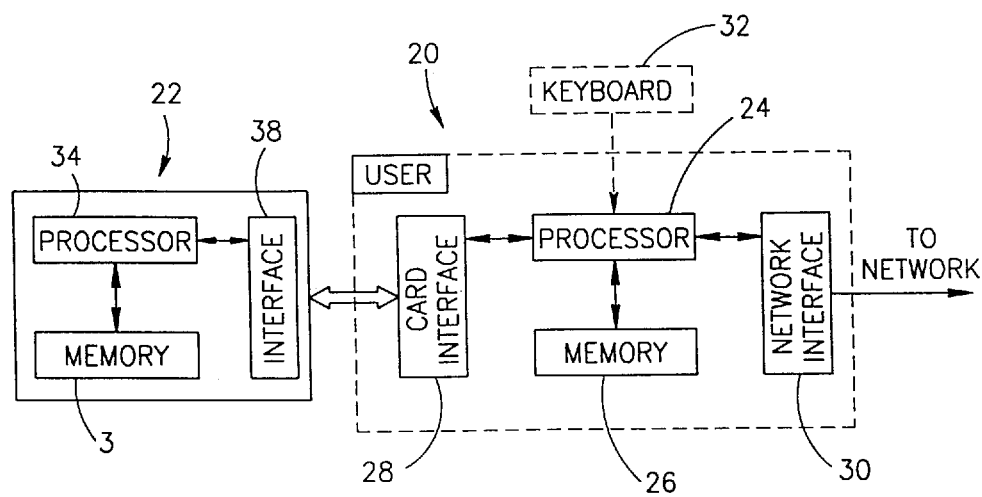
FIG. 2 is a schematic illustration of the hardware components employed by a user station, according to one embodiment of the PIR system.

FIG. 2, showing a schematic illustration of the hardware components employed in a user station, according to one embodiment of the PIR system. As shown the user's station comprising a main module 20 capable of communicating with an auxiliary module 22, being typically but not necessarily, a conventional portable smart card. Module 20 includes processor 24 coupled to memory sub-module 26, card interface module 28, network interface module 30 and optionally also to keyboard 32. Smart card 22 accommodates in its turn, local processor 34 coupled to local memory sub-module 36 and local interface module 38, for communicating with the main module 20. Processor 24, being for example the known X86 based processor—commercially available by Intel Corp, is suitably programmed to carry out the computational steps of the user station, in accordance with the various embodiments of the invention. Memory 26 accommodates an execution code area for storing the execution code of the user station, and a working memory which is utilized in the course of operation of said code.

The bi-directional communication between the user's station and the network (i.e. data transmitted from the user to the databases and vise versa) is effected through known per se network interface 30.

The portable smart card 22, is serving, preferably, for the generation of a string S in a random, pseudo-random or other manner, depending upon the desired level of privacy. The highest level of privacy, necessitates generation of random string, e.g. by employing the technique for generating private and public keys in the well known RSA scheme. Other, known per se, hardware or software based solutions for generating the pseudo random or random string may be utilized, using to this end processor 34, and thereafter communicating the result, preferably in an encoded form, to module 20. Depending on the particular application, the smart card may include additional components, e.g. real-time clock, or on the contrary being rendered degenerated, i.e. including only memory and interface. The smart card, may of course, be utilized also for user authentication and encryption/decryption purposes.

FIGS. 3 A–B illustrates a block diagram of the various steps performed in the course of operation of a PIR system, of the kind shown in FIG. 1, in accordance with one embodiment of the invention. A far more detailed description pertaining to the embodiment of FIG. 3, is given below:

Preliminaries and Definitions

In the hereinbelow description, the following nomenclature is used: U for the user, the k databases by $DB_1, \ldots, DB_k$ (referred to occasionally also as $DB_0$-$DB_{k-1}$) the identical data they hold by $x \in \{0,1\}^n$, and the bit in which U is interested by $i \in [n] \triangleq \{1, 2, \ldots, n\}$.

The Linear-Summation Scheme

There follows a description of various schemes ("A Basic Two-Database Scheme" and "A Multi-Database Scheme") that are of the "linear summation" type. In these schemes, the user sends queries in the form of subsets $S \subseteq \{1, \ldots, n\}$, and the database replies with $\oplus_{j \in S} x_j$.

For a set S and an element a let S⊕a denote the set S∪{a} if a∉S and S\{a} if a∈S.

A Basic Two-Databases Scheme

There follows a simple scheme that allows the user U to privately obtain the bit $x_i$ by receiving a single bit from each of two databases. The user uniformly selects a random set S ⊆[n] (i.e., each index j ∈ [n] is selected with probability ½). The user sends S to $DB_1$ and S⊕i to $DB_2$. As shown the set S depends solely on a random number (constraint (c) in the "general definition" above) whereas the set S⊕i depends on both random number and the sought data item address (constraint (a) and (b) in the "general definition" above). Despite the dependency of S⊕i on the sought data item address, the specified Basic Two-Databases Scheme complies with the privacy requirements. Each of these databases, when receiving the message I ⊆[n], replies with a single bit which is the exclusive-or of the bits with indices in I (i.e., $DB_1$ replies with ($\oplus_{j \in S} x_j$ whereas $DB_2$ replies with $\oplus_{j \in S \oplus i} x_j$). The user exclusive-ors the answers it has received, thus retrieving the desired bit $x_i$. Clearly, none of the databases has obtained any information regarding which index was desired by the user (as each of the databases obtains a uniformly distributed subset of [n]).

Although the above scheme is less obvious than a solution in which one database sends all n bits to the user, it is not superior as far as the total amount of communication exchanged between the user and the database. Indeed each database sent only a single bit, but the messages sent by the user (specifying arbitrary subsets of [n]) are n bits long. Yet, this simple scheme serves as a basis for more efficient ones.

A Multi-Database Scheme

In this subsection, a scheme for any number k ($k=2^i$) of databases available is presented. Later, there is shown a better scheme for the case of large k (i.e., k>4). However, the scheme presented below, together with the covering codes method that is presented in the next subsection leads to a better upper bounds for small values of k (the number of databases) and in particular for the case k=2.

The scheme presented in this subsection allows the user to obtain the desired bit by asking queries to $k=2^d$ databases, for any d≧1, and requires total communication of $2^d \cdot (d \cdot n^{1/d}+1)$. The key idea is to associate [n] with the d-dimensional cube $[l]^d$ ($l^d = n$) and generalize the simple scheme described above, which may be viewed as the 1-dimensional case (i.e., d=1). In the generalization, each of the $2^d$ databases is queried for the exclusive-or of the bits in a uniformly distributed subcube. As in the basic scheme, the different subcubes are related, and this allows to retrieve the desired bit. The saving in communication comes from the fact that subcubes can be described more succinctly than general subsets.

It is assumed, without loss of generality that $n=l^d$. x is embedded in a d-dimensional cube, associating each position j ∈ [n] with a d-tuple $j_1, \ldots, j_d) \in [l]^d$, in the natural manner. In particular, the index i of the desired bit is associated with a d-tuple $(i_1, \ldots, i_d) \in [l]^d$. It will also be convenient to associate the $k=2^d$ databases with strings in $\{0,1\}^d$. The scheme works as follows.

1. U chooses uniformly and independently d random subsets $S_1^0, S_2^0, \ldots, S_d^0 \subseteq [l]$. Based on these subsets it defines another d subsets of [l] by $S_1^1 = S_1^0 \oplus i_1, S_2^1 = S_2^0 \oplus i_2, \ldots, S_d^1 = S_d^0 \oplus i_d$. These 2d subsets are paired in the natural way; namely, $(S_1^0, S_1^1), \ldots, (S_d^0, S_d^1)$. To each of the $k=2^d$ databases U sends one subset per pair, corresponding to the name of the database. Namely, for every $a = \sigma_1 \ldots \sigma_d \in \{0,1\}^d$, the user sends the subsets $S_1^{\sigma_1}, S_2^{\sigma_2}, \ldots, S_d^{\sigma_d}$ to $DB_a$.

2. Upon receiving the d subsets $S_1^{\sigma_1}, S_2^{\sigma_2}, \ldots, S_d^{\sigma_d}$, the database (i.e., $DB_{\sigma_1 \ldots \sigma_d}$) replies with the exclusive-or of the subcube defined by these subsets. Namely, $DB_{\sigma_1} \ldots \sigma_d$ replies with the bit $$\oplus_{j_1 \in S_1^{\sigma_1}, \ldots, j_d \in S_d^{\sigma_d}} x_{j_1, \ldots j_d}$$

3. The user exclusive-ors the $k=2^d$ bits it has received. The correctness of the above scheme can be easily verified. The privacy of the above scheme follows by observing that each database receives a sequence of d uniformly and independently chosen subsets of [l]. Thus, the queries to each database are distributed in the same way, for each possible value of $i=(i_1, \ldots, i_d)$ The communication involved in the above scheme consists of sending a sequence of d subsets in [l] to each database, and receiving a single bit back. Hence the total communication complexity is $k \cdot (d \cdot l + 1) = 2^d \cdot (1 + d \cdot \sqrt[d]{n})$. It should be noted that the communication in the present scheme is not balanced. The user sends $d \cdot n^{1/d}$ bits to each database, and receives a single bit from each in response. There follows a description of a technique which accomplishes a balanced communication.

Figure 3A:
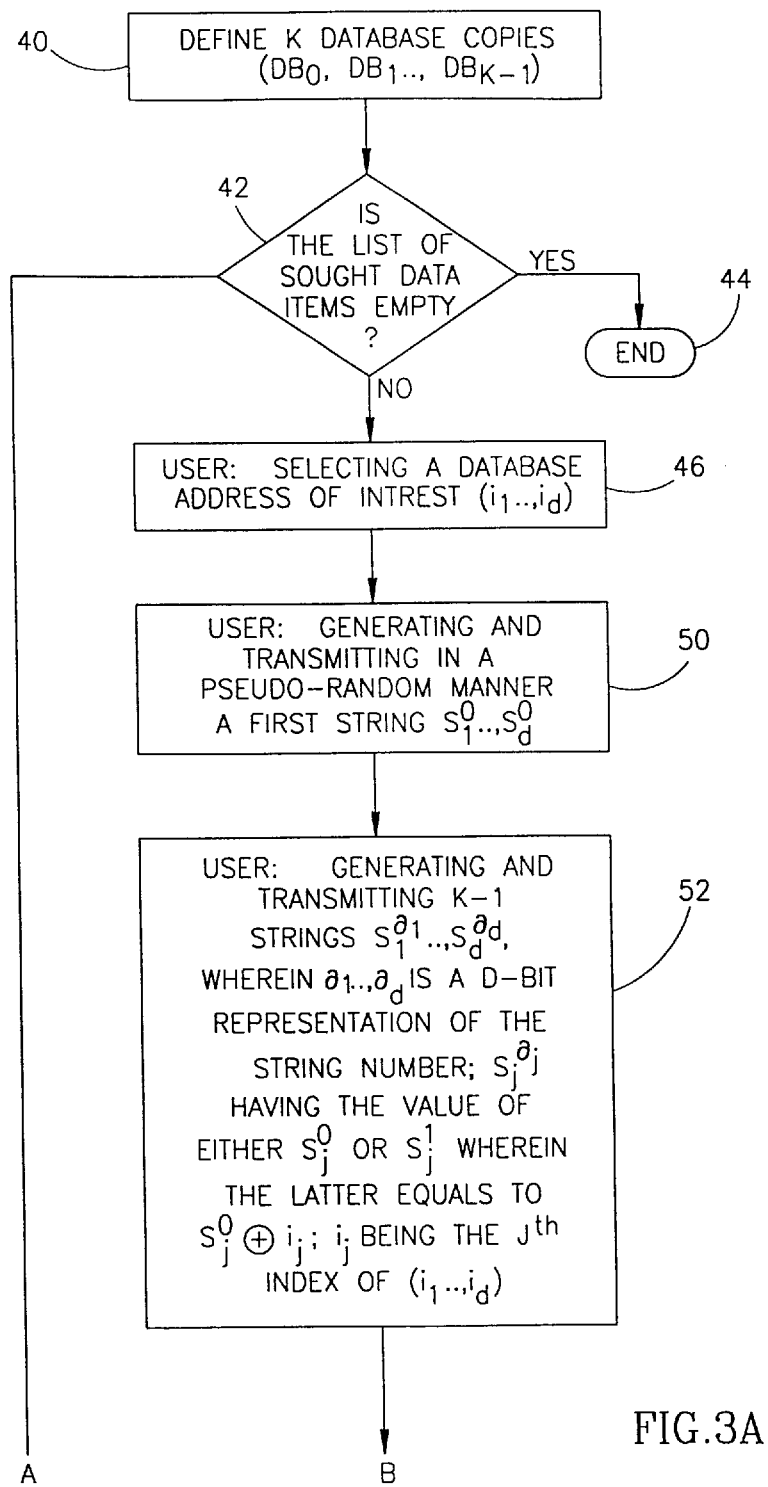
FIGS. 3 A–B is a block diagram showing the steps performed in the course of operation of a PIR system, of the kind shown in FIG. 1, in accordance with one embodiment of the invention.
Figure 3B:
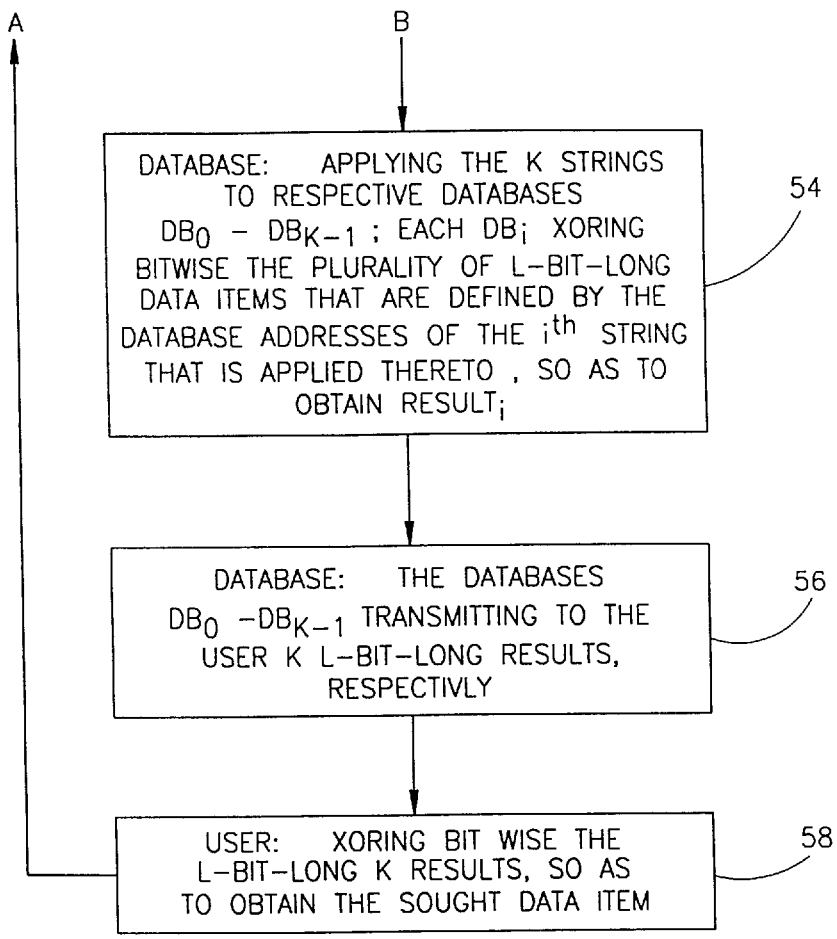

Those versed in the art will readily appreciate that FIGS. 3A–B, with minor modification, fit also to the more generalized scheme described in the foregoing, e.g. by referring in blocks 50 and 52, to $S_0$ and $S_1 \ldots S_{k-1}$, respectively, and further by replacing the xor functions in blocks 54 and 58, respectively, by a different function (which does not necessarily produce one l-bit-long result). Whilst FIG. 3 illustrates one round of bi-directional communication, i.e. the user queries the database and receives answers, by an alternative embodiment the procedure illustrated in FIG. 3, occurs in two or more rounds.

Attention is now directed to FIGS. 4 A–E showing five schematic illustrations for explaining the mathematical background of the invention, in particular with reference to the aforementioned "multi-database scheme".

Thus, by this particular example there is shown a simplified two dimensional database $DB_0$ 60 for holding 16 bits in 4×4 arrangement.

Suppose that the data item of interest is stored in location (0,3). Assuming that the execution of the pseudo-random function stipulated above, results in the string $S_0^0$ (0110), wherein the first bit corresponds to row #0, the second bit corresponds to row #1, the third bit corresponds to row #2, and the fourth bit corresponds to row #3. Since only the second and third bits are set, rows 1 and 2 are selected as indicated by markings 62.

Assuming also that the execution of the pseudo-random function stipulated above, results in the string $S_1^0$ (0110), wherein the first to fourth bits correspond, respectively to columns 0 to 3, i.e. columns 1 and 2 are selected as indicated by markings 64. Accordingly the four data items defined by the selected (r,c) indices are (1,1), (1,2), (2,1) and (2,2), as clearly indicated by square 66 having vertical hatching.

It should be noted that for sake of clarity, only a portion of the database contents is shown (i.e. the contents of database address (r,0)–0≦r≦3, and (0,c)–0≦c≦3)). In other words, although not shown, all 16 database locations are occupied storing each the value 0 or 1.

Figures 4A, 4B:
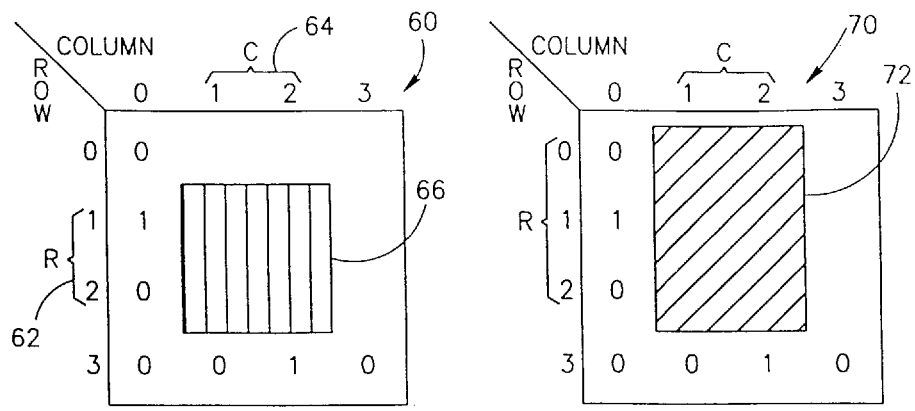
FIGS. 4 A–E are five schematic illustrations for explaining the mathematical background of the invention.
Figures 4C, 4D:
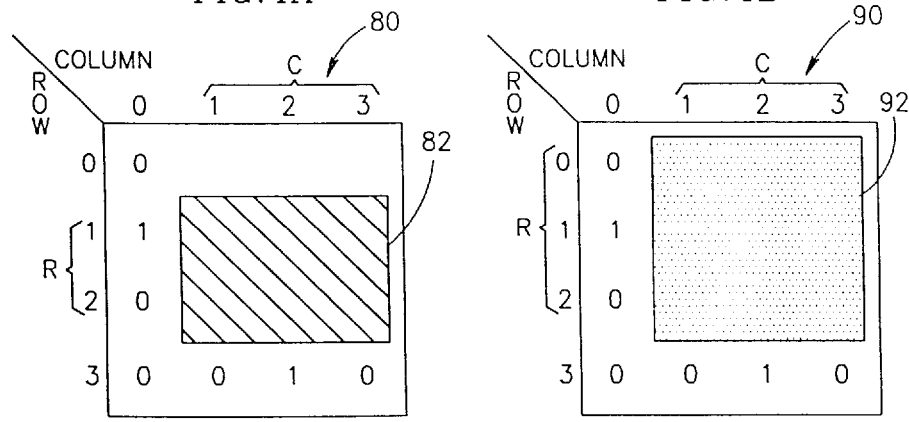

Moving now to FIG. 4b, the database copy $DB_1$ (70) is shown. String $S_0^1$, $S_1^0$ is applied to $DB_1$, wherein $S_1^0$ is the same as before and $S_0^1$ equals to $S_0^0 \oplus r_0$, (i.e. the row index 0 forming part of the database address (0,3) of the sought item). The resulting database portion that is defined by $S_0^1$, $S_1^0$ is indicated by rectangular 72 having positive gradient hatching. In a similar manner $DB_2$, (80) shown in FIG. 4c is queries with $S_0^0$, $S_1^1$, wherein the latter equals to $S_1^0 \oplus c_3$ (i.e. the column index 3 forming part of the database address (0,3) of the sought item), giving rise to rectangular 82 having negative gradient hatching. $DB_3$, (90) shown in FIG. 4D, illustrates the selected dotted square 92 which is generated by applying to $DB_3$, the string $S_0^1$, $S_1^1$, (including both the row number 0 and the columns number 3 of the sought item).

Figure 4E:
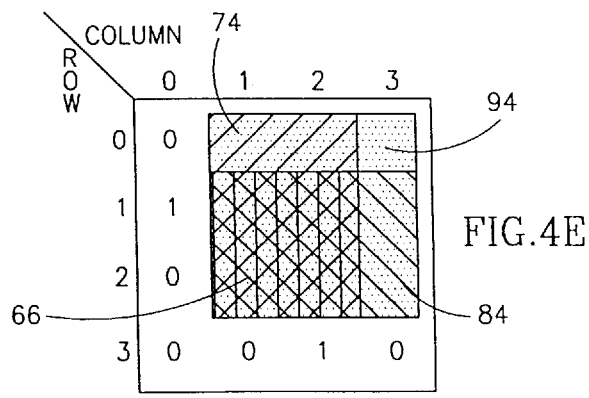

FIG. 4E, illustrates the result of the xoring operation effected by each database and by the user. It is recalled that a bit having "bit" value (0 or 1) that is subject to the xor operation even times is nulled (i.e. results in logical "0" value), as opposed to the original "bit" value if it xored odd times.

Bearing this in mind, it is readily evident that the contents of block 66 is nulled as it participates four times in the xoring operation. The contents of the complementary section 74 is also canceled as it participates twice in the xoring operation (dotted square, and positive gradient hatching).

Complementary section 84 is, likewise, nulled since it participates in the xoring operation twice (dotted, and negative gradient hatching). As opposed thereto, section 94, being the sought 1-bit data item pointed by address (0,3), is xored only once yielding thus a "bit" value, i.e. the contents of database address (0,3).

FIGS. 4 A–E clearly show that each string contains a common 30 subset of database addresses (being by this particular embodiment block 66 that is forming part also of rectangulars 72, 82, and square 92), and a complementary set. By this particular example the complementary subsets associated, respectively, with $DB_0$–$DB_3$ are the empty subset ($DB_0$), the one denoted by rectangular 74 ($DB_1$), the one denoted by rectangular 84 ($DB_2$), and the one denoted, collectively, by 74, 84 and 94 ($DB_3$). The complementary subsets associated with $DB_1$, $DB_2$, and $DB_3$ are of course positive complementary subsets, in the sense defined above. The complementary subsets are clearly distinguishable one with respect to the other, and they are generated each by utilizing a unique portion of the sought database address. Put differently, they are contingent upon the database address of the sought data item.

FIGS. 4A–4D exemplify the underlying idea of privacy, in the sense described in the foregoing, i.e. that the sought address is not applied, explicitly, to any one of the databases. More specifically, consider the sought address (0,3). If $S_0^0$ is chosen in a random manner, there are equal chances that the row index (0) is or isn't included in $S_0^0$. The same applies to the column index (3) with respect to $S_1^0$. Therefore, $DB_0$, upon receiving the two strings describing $S_0^0$ and $S_1^0$, gets no information on the sought address. Consider now the set $S_0^1 = S_0^0 \oplus 0$. The row index 0 is equally likely to be included or not to be included in $S_0^0$. As specified in the foregoing, the $\oplus$ operation will put 0 in if it was not in originally, and will put it out if it was in originally. Therefore, it also holds with respect to $S_0^1$ that 0 is equally likely to be included or not to be included therein. The same holds, mutatis mutandis, with respect to each of the other combinations (row or column index, $S_0^0$ or $S_0^1$, $S_1^0$ or $S_1^1$, respectively).

Therefore, from the point of view of each individual database $DB_0$, $DB_1$, $DB_2$, $DB_3$, (i.e. database operator) the sought address is essentially not distinguishable from any other, unrelated address.

It should be noted that preferably, but not necessarily, all the data items of $DB_i$ that are defined by string $S_i$, that is applied to the database, are xored one with respect to the other, giving rise to the generation of an l-bit-long result, e.g. in the example of FIG. 4, wherein l=1, the result is a single bit. The 1-bit-long result received from each database, are then xored by the user, thereby deriving the sought result. This is however not obligatory and by another embodiment some of the xoring burden, that had been carried out at the database end, can be shifted to the user. Obviously in the latter embodiment, each database generates and transmits to the user more than one 1-bit-long result.

Attention is now directed to FIGS. 5 A–C showing a block diagram of the steps performed in the course of operation of a PIR system, of the kind shown in FIG. 1, in accordance with another embodiment of the invention. A far more detailed description pertaining to the embodiment of FIG. 5, is given in the section "Covering Code Scheme", below.

The Covering Codes Scheme

In this subsection a technique based on covering codes (from coding theory) is described. This technique essentially maintains the total communication complexity of the schemes described in the previous subsection (i.e. multi-database scheme) but reduces the number of participating databases. It is especially useful when the number of databases (i.e., k) is small (i.e., k=2 and k=4).

We start with an example. For d=3, the scheme of the previous subsection consists of a user and $2^d=8$ databases whose names are associated with the binary strings of length d=3. The user sends a subcube defined by the sets ($S_1^{o_1}$, $S_2^{o_2}$, $S_3^{o_3}$) to $DB_{o_1 o_2 o_3}$ which replies with the exclusive-or of the bits residing in this subcube. Thus 3 $\sqrt[3]{n}$ bits are sent from the user to each database, which replies with a single bit. The key idea in the improvement is that $DB_{000}$, which gets the query ($S_1^0$, $S_2^0$, $S_2^0$), can produce a relatively short string which contains the answer to the query ($S_1^0$, $S_2^0$, $S_3^0$), sent to $DB_{001}$. Specifically, it knows $S_1^0$ and $S_2^0$ and it also knows that $S_3^1$ must be one of form $S_3^0 \oplus j$, for some $j \in \{1, 2, \ldots, \sqrt[3]{n}\}$. Thus $DB_{000}$ can emulate $DB_{001}$ by sending the $\sqrt[3]{n}$ bits corresponding to the $\sqrt[3]{n}$ possible queries which could have been sent to $DB_{001}$. In the same fashion, $DB_{000}$ can emulate both $DB_{010}$ and $DB_{100}$. Thus, by letting $DB_{000}$ emulate $DB_{100}$, $DB_{010}$ and $DB_{001}$ and letting $DB_{111}$ emulate $DB_{011}$, $DB_{101}$ and $DB_{110}$, a scheme for two databases with total communication complexity $O(\sqrt[3]{n})$ is obtained.

In general, the above "emulation" method depends on the ability to cover the strings in $\{0,1\}^d$ by few d-bit long string, where each string may cover itself and all strings at Hamming distance 1 from it. In other words, the problem is reduced to the question of the ability to cover $\{0,1\}^d$ by balls of radius 1 (in the Hamming geometry). This is a well known problem in coding theory. A covering code, $C_d$, with radius 1 for $\{0,1\}^d$ is a collection $C_d = \{c_1, c_2, \ldots, c_k\} \triangleq \{0,1\}^d$, such that the balls of radius 1 around the codewords cover the space; namely, $$\{0,1\}^d \triangleq \cup_{c_j \in cd} B(c_j, 1)$$

where B(c,1) is the set of all d-bit long strings which differ from c in at most one position.

Given a (radius 1) covering code, $C_d = \{c_1, c_2, \ldots, c_k\}$ (for $\{0,1\}^d$), the emulation technique is exploited to derive a k-database protocol of communication complexity $O(d \cdot k \cdot n^{1/d})$. The user, being interested in position $i = (i_1, \ldots, i_d)$, picks uniformly $S_1^0, S_2^0, \ldots, S_d^0 \subseteq [n^{1/d}]$, and sets $S_1^1 = S_1^0 \oplus i_1$, $S_2^1 = S_2^0 \oplus i_2$, \ldots, $S_d^1 = S^{d0} \triangleq i_d$. The user sends to $DB_c (c \in C_d)$ the subcube corresponding to codeword c (i.e., ($S_1^{\sigma_1}, \ldots, S_d^{\sigma_d}$) where $c = \sigma_1 \ldots \sigma_d$). Each $DB_c$ replies by emulating itself (i.e., one bit) and the databases corresponding to the words covered by the codeword c (i.e., $n^{1/d}$ bits per each such database). All these answers allow the user to compute the answer it would have received in the protocol for $2^d$ databases, and consequently retrieve the desired bit. The privacy of the original $2^d$-databases scheme is clearly preserved. As for the communication complexity of the new protocol, we note that $d \cdot n^{1/d}$ bits are sent from U to each database and that the total number of bits sent back is $k=(2^d-k) \cdot n^{1/d}$ (it should be noted that only the emulation of databases corresponding to non-codewords requires $n^{1/d}$ bits and that it suffices to emulate/cover each such database once. (Formally, we consider a fixed exact cover of $\{0,1\}^d$ by sets $S(c_j)$'s so that $S(c_j) \subseteq B(c_j,1)$, for every $j=1, \ldots, k$.)). Thus, the total communication equals $(dk+2^d-k) \cdot n^{1/d}+k$, and the following theorem applies:

Theorem 1

Let d and k be integers so that there is a k-word covering code (of radius 1) for $\{0,1\}^d$. Then there exists a private information retrieval schemes for k databases, each holding n bits of data, so that the communication complexity of the scheme is $k+(2^d+(d-1) \cdot k) \cdot n^{1/d}$.

The construction given above, for d=3, uses the fact that $\{(0,0,0),(1,1,1)\}$ is a covering code with radius 1 of $\{0,1\}^3$. For d=4 there exist covering codes with four codewords (e.g.,$\{(0,0,0,0),(1,1,1,1),(1,0,0,0),-(0,1,1,1)\}$) but not with fewer codewords (due to the well known volume bound from coding theory). Table 1 presents a list the best known covering codes for d up to 8, and the communication complexity of the resulting protocol (i.e., $(2^d+(d-1)k) \cdot n^{1/d}$, ignoring the additive term of k). All these covering codes are optimal (minimum size).

As clearly arises from table 1 below, the improvement derived by the emulation method (over the simpler multi-database scheme technique which requires $2^d$ databases) is quite meaningful for small values of d. Covering codes with larger radii (say 2 or 3) are also applicable in principle. For example, a k word radius 2 covering code of $\{0,1\}^d$ would yield communication complexity $k \cdot d \cdot n^{1/d}+k \cdot (_2^d) \cdot n^{2/d}$.

Reviewing the parameters of the best codes, they turn out to be inferior than the radius 1 codes.

The results using the covering codes technique are most appealing for the cases of 2 and 4 databases. These cases are summarized in the next corollary to Theorem 1.

TABLE 1

Covering Codes and Protocols

| dimension (i.e., d) | $2^d$ | #codewords (databases) (i.e., k) | total communication |
| --- | --- | --- | --- |
| 3 | 8 | 2 | $12n^{1/3}$ |
| 4 | 16 | 4 | $28n^{1/4}$ |
| 5 | 32 | 7 | $60n^{1/5}$ |
| 6 | 64 | 12 | $124n^{1/6}$ |
| 7 | 128 | 16 | $224n^{1/7}$ |
| 8 | 256 | 32 | $480n^{1/8}$ |

Corollary

There are private information retrieval schemes for n bits data, with the following parameters:

For two databases (i.e., k=2), the communication complexity is $12 \sqrt[3]{n}+2$.

For four databases (i.e., k=4), the communication complexity is $28 \sqrt[4]{n}+4$.

Figure 5A:
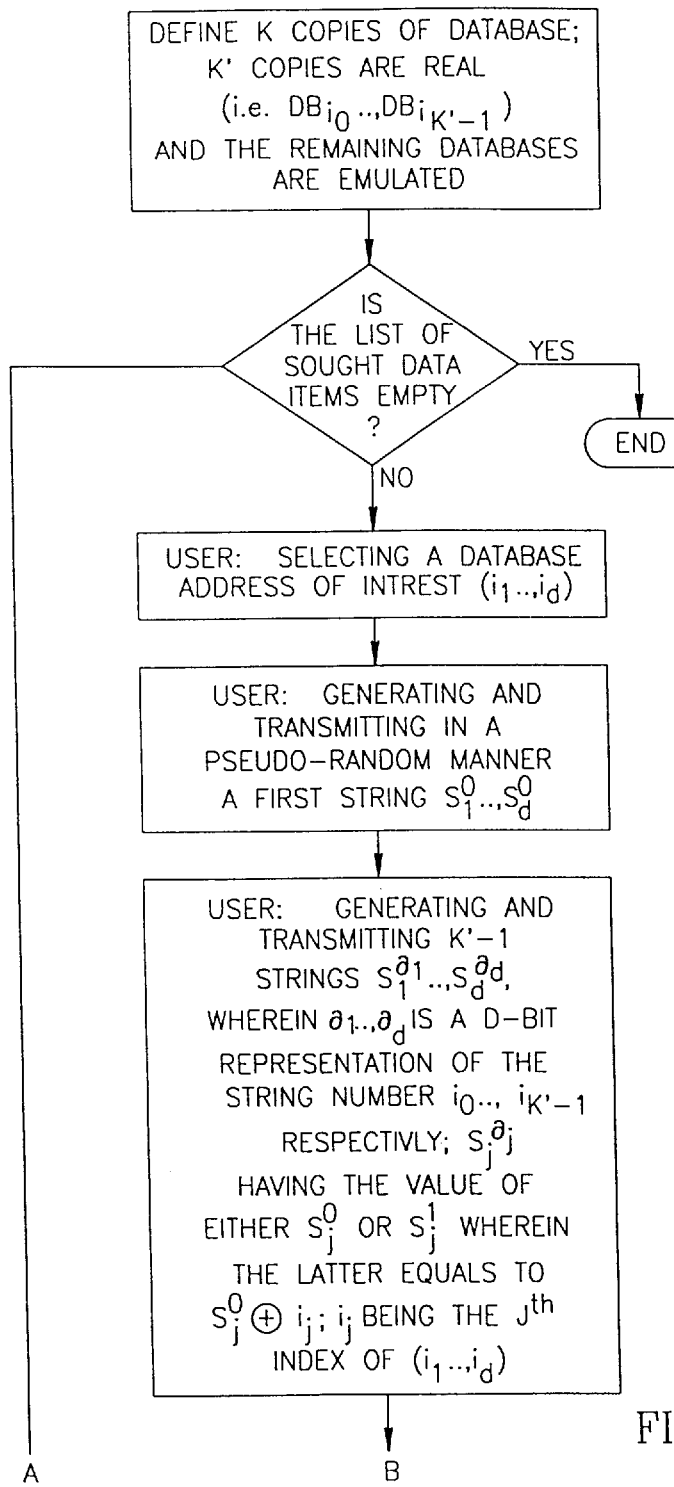
FIGS. 5 A–C is a block diagram showing the steps performed in the course of operation of a PIR system, of the kind shown in FIG. 1, in accordance with another embodiment of the invention.
Figure 5B:
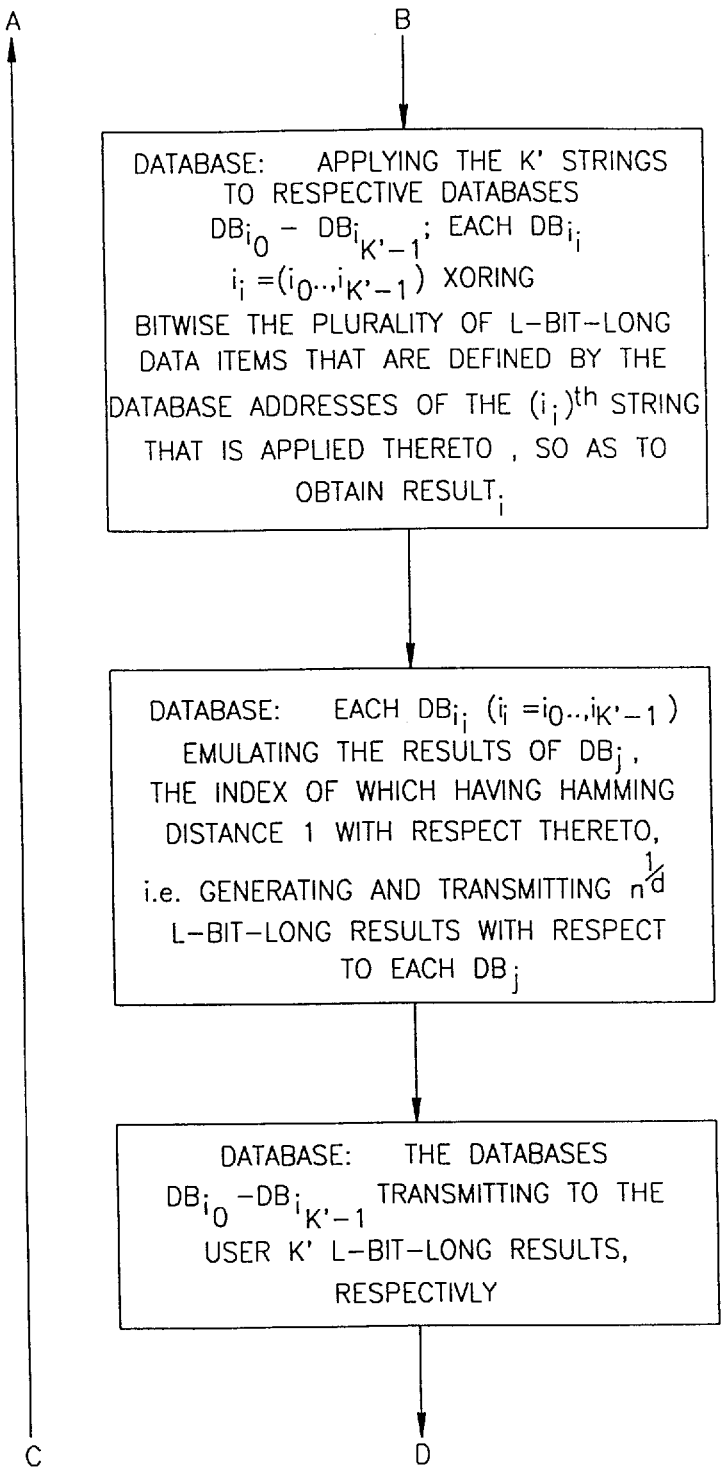
Figure 5C:
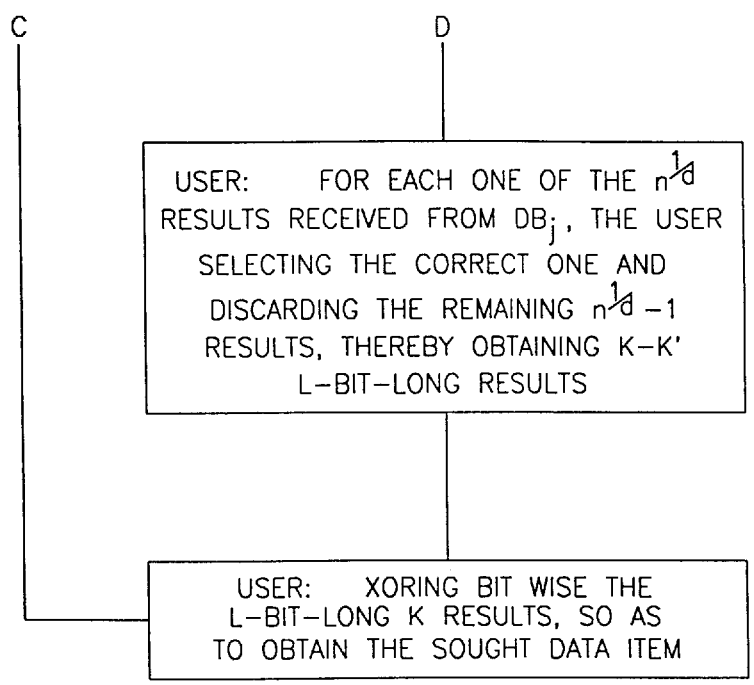

It should be noted that those versed in the art will readily appreciate that FIGS. 5 A–C, with minor modification, fit also to the more generalized scheme described in the foregoing. The various modifications described with reference to FIGS. 3 A–B, apply, mutatis mutandis, also to FIGS. 5A–C.

Attention is now directed to FIGS. 6 A–B showing two schematic illustrations of respective conventional and improved database arrangements, for achieving the balancing technique of the PIR method, according to one embodiment of the invention. As shown, the one dimensional n bit database (100) is rearranged as a two dimensional m times n/m database (102). Applying, now, the same string to each one of the m rows, results in a substantially reduced communication volume from the user to the database as if it were an (n/m) size database. The communication volume from the database 102 to the user is m times larger than the communication volume between the database and the user in the case of a database of size (n/m). It is accordingly appreciated that by reducing the communication volume between the user and the database and increasing the communication volume between the database and the user the desired balanced communication volume is accomplished. Clearly if only one bit from among the received m bits is of interest, the remaining m-1 bits can simply be discarded.

A detailed description of the balancing technique, in a more generalized manner than that illustrated in FIGS. 6 A–B is given in the section "generic balancing technique", below:

A Generic Balancing Technique

Consider an arbitrary scheme for privately retrieving information from several databases in which the communication is carried out in one round (i.e., the user simultaneously queries each database and receives answers from which it computes the desired bit). Given such a scheme for databases containing n/m bits, one can derive a scheme for databases containing n bits by repeating the scheme in parallel as follows. The user views the n bits as a m-by-n/m matrix of bits. To retrieve the (j,i) -th bit in the matrix, U executes the n/m-bit scheme with i being the desired bit (ignoring, for the time being, the value of j). Now, each database views itself as participating in m different executions of the n/m-bit scheme, each one with a different row (an n/m-bit string). Namely, in the j-th execution (j=1, . . . , m), the database computes its response with respect to the j-th row. Thus, the user privately retrieves the entire i-th column of the matrix, from which it finds the desired (j,i)-th bit. Comparing the communication complexity of the original n/m bits scheme with the resulting n bits scheme results in that the communication from the user to each database remains unchanged, while the communication in the database-to-user direction increases by a factor of m.

Specific examples of $m=n^{1/2}$, k=2 and $m=n^{1/3}$, k=4 result in respective communication volume of $O(n^{1/2})$ and $O(n^{1/3})$.

Figure 6A:
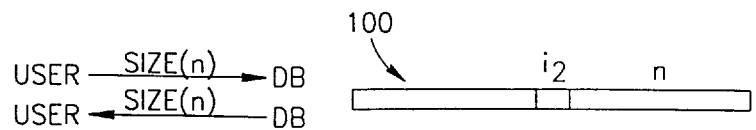
FIGS. 6 A–B are two schematic illustrations of respective conventional and improved database arrangements, for achieving the balancing technique of the PIR method, according to one embodiment of the invention.
Figure 6B:
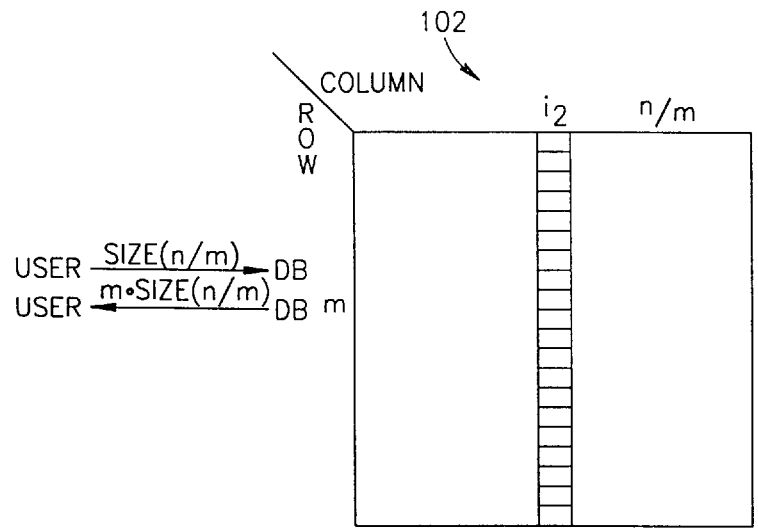

It should be noted that the balancing technique of the invention as described with reference to FIGS. 6A and 6B is not bound to any particular arrangement of the top layer database. In the specific examples of FIGS. 6A and 6B top layer stands for the entire database (100) and each row of database 102.

Any database arrangement is valid provided, however, that all m layers database are arranged identically, as described in section "Generic Balancing Technique" above.

Figure 7:
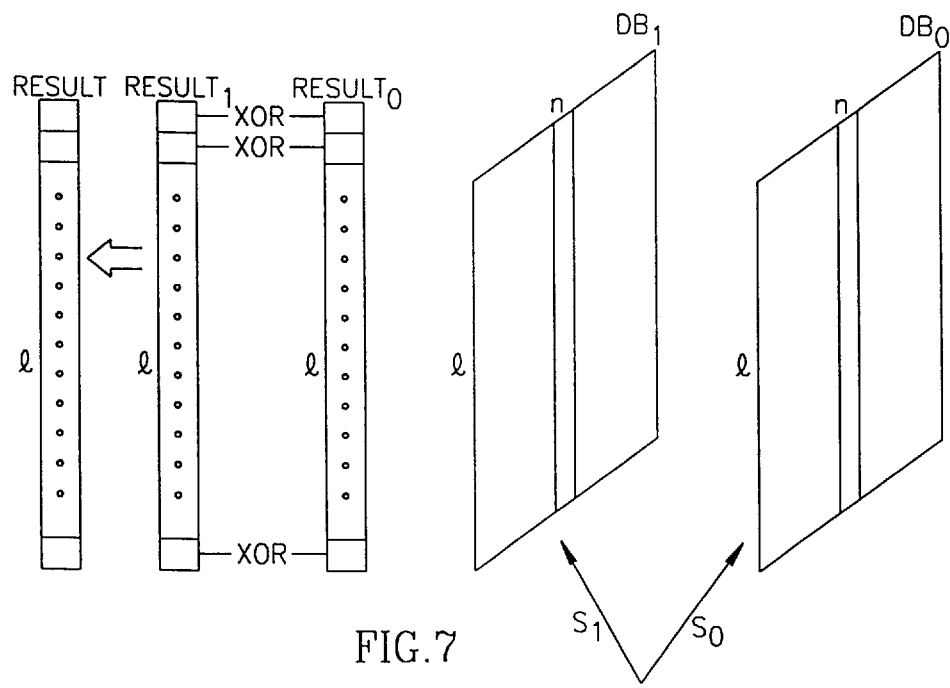
FIG. 7 is a schematic illustration showing the utilization of the balancing technique, for handling l-bit-long (l>1) data items in accordance with one embodiment of the PIR system and method, of the invention.

Attention is now directed to FIG. 7 showing a schematic illustration of the utilization of the balancing technique, for handling l-bit-long (l>1) data items (i.e the database holding records, with record size>1) in accordance with one embodiment of the PIR system and method, of the invention. By this particular embodiment m=l. A detailed description of the latter embodiment is given in the section "Private Information Retrieval of Blocks", below:

Private Information Retrieval of Blocks

In this section we consider a more general model of private information retrieving in which the information is partitioned into blocks (or records) rather than single bits. For simplicity, it is assumed that each block/record contains l bits. PIR(l, n, k) signifies the problem of retrieving privately an (l-bit long) information block from k databases, each holding the same n blocks. Previous sections have dealt with PIR(1, n, k). Clearly PIR(l, n, k) can be solved by l invocations of PIR(1, n·l, k), but there are much more efficient reductions of PIR(l, ·, k) to PIR(1, ·, k). (In fact PIR(l, n, k) can be easily solved by l invocations of PIR(1, n, k) just by considering in the j-th invocation only the j-th bit of each of the n blocks.)

In this connection it should be noted that the Generic Balancing Technique described in the foregoing actually provides such a reduction. Specifically, Proposition A Suppose that PIR(1, n, k) can be solved by a one-round protocol in which the user sends $\alpha_k(n)$ bits to each database and receives $\beta_k(n)$ bits in return (from each database). Then, for every l>1, PIR(l, n, k) can be solved by a one-round protocol in which the user still sends $\alpha_k(n)$ bits to each database and receives $l\beta_k(n)$ bits in return (from each database).

In the aforementioned "Generic Balancing Technique" section, the asymmetric effect that the above transformation has on the communication complexity has been emphasized (i.e., increasing the communication from the databases to the user while maintaining the communication complexity in the other direction). An "asymmetric" transformation of the opposite direction follows.

Proposition B

Suppose that PIR(1, n, k) can be solved by a one-round protocol in which the user sends $\alpha_k(n)$ bits to each database and receives $\beta_k(n)$ bits in return (from each database). Furthermore, suppose that the user retrieves the desired information bit by computing $g(\Sigma_{j=1}^{k} f_j(y_j))$, where $y_j$ is the message obtained from $DB_j$, the $f_j$'s are arbitrary fixed functions mapping binary strings into elements of some finite field (of cardinality at most $2^{\beta_k(n)}$), summation is done over this field and g is an homomorphism of the field onto GF(2). (It should be emphasized that the $f_j$'s may not depend on the desired bit no; on the randomness used by U.) Then, for every m>1, PIR(1, m·(n-1), k) can be solved by a one-round protocol in which the user sends m·$\alpha_k(n)$ bits to each database and receives $\beta_k(n)$ bits in return (from each database).

It should be noted that all "pure" schemes (i.e., before "optimizing via balancing") presented in previous sections meet the hypothesis of the proposition. Furthermore, the proposition can be generalized to PIR(l, ·, k) schemes (in which each bit in the block is computed as conditioned above).

Proof

For simplicity, it is assumed that the $f_j$'s mentioned in the hypothesis are identity transformations. The solution to PIR(1, m·(n-1), k)follows. The N≜m·(n-1) bits, in each database, are partitioned into m strings each holding n-1 bits and augment each of these strings by a dummy position set to zero. Bit positions in [N] are represented as pairs in [m]×[n-1]in the natural manner. The user, wishing to retrieve i=[i', i''] ∈ [m]×[n-1], employs PIR(1, n, k) in parallel m times. In the $j^{th}$ instance U behaves as when asking for position i'' if j=i' and as asking for position n otherwise. Each database adds together the answers it would have sent in each of the m invocations of PIR(1, n, k) and sends this sum as its only message. The user just adds all answers it has obtained and applies g as it would have done in a single invocation of PIR(1, n, k). It should be noted that each database sends only one $\beta_k(n)$-bit long string rather than m such strings. Evidently, the new scheme satisfies the privacy requirement. Correctness follows from associativity of addition, the hypothesis that g is a homomorphism, and the fact that the dummy position (i.e., position n) is set to 0.

Combining the above two propositions results in:

Corollary

Let PIR(1, n, k) be as in Proposition B and l,m>1. Then, PIR(l, m·(n-1), k) can be solved by a one-round protocol in which the user sends m·$\alpha_k(n)$ bits to each database and receives l·$\beta_k(n)$ bits in return (from each database). In particular, PIR(l, n, k) can be solved within l times the complexity of PIR(1,1+n/l, k).

In some settings the number of records is not substantially bigger than the length of individual records. In these settings the overhead introduced by private information retrieval is quite small (compared to non-private information retrieval). Furthermore, for $l \geq n$, the basic two-databases scheme (of Section 3.1) becomes of interest. Specifically, overhead factor of four is obtained:

Corollary

Let $l \geq n$. Then, PIR(l, n, 2) can be solved by a one-round protocol of total communication complexity 4·l.

Similarly, by utilizing the four database scheme together with generic balancing we get:

Corollary

Let $l^2/4 \geq n$. Then, PIR(l, n, 4) can be solved by a one-round protocol of total communication complexity 8·l.

Figure 8B:
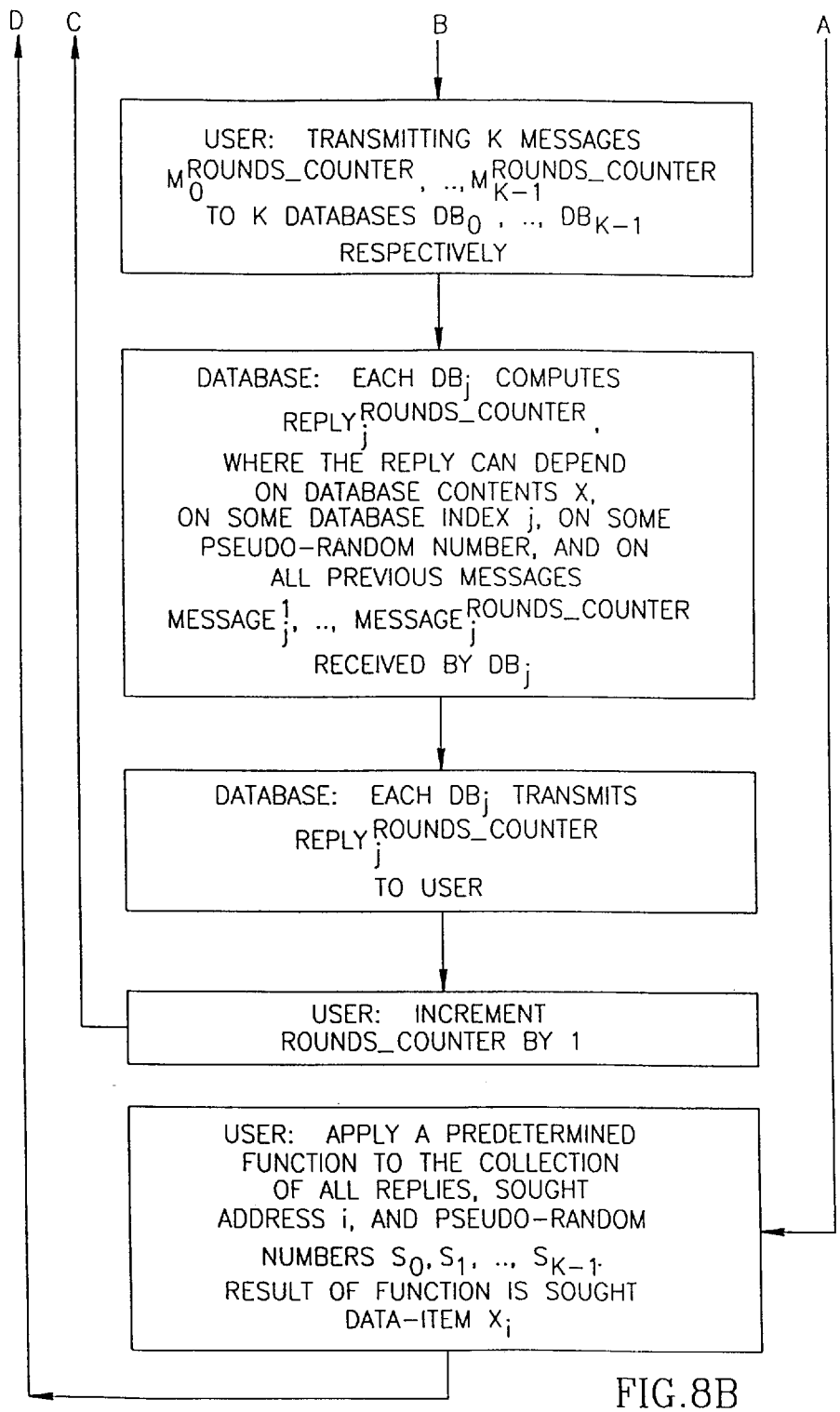
FIG. 8 A–B is a block diagram showing the steps performed in the course of operation of a PIR system, of the kind shown in FIG. 1, in accordance with yet another embodiment of the invention.

Attention is now directed to FIG. 8, showing a block diagram of the steps performed in the course of operation of a PIR system, of the kind shown in FIG. 1, in accordance with the invention, as explained in the foregoing. A specific example of the general PIR scheme that is described in FIG. 8, is given in section "A simple scheme for $\log_2 n+1$ Databases" below. This specific example employs the technique of low-degree polynomials as disclosed in the publication by D. Beaver and J. Feigenbaum. ibid.

There follows a specific example of the specified general definition which illustrates, inter alia, the use of a function other than the xor.

There follows a non limiting exemplary realization which will assist in understanding the terminology used in the specified general definition.

Glossary

In the example below:

i stands for the sought data item having s bits;

$g_1(p), \ldots, g_s(p$ is a message from among k messages that the user sends to respective k database copies $DB_0$–$DB_{k-1}$. By this particular embodiment s+1 stands for k, i.e. there are s+1 messages that are sent to $DB_0$–$DB_s$. Each of these queries depend on both i and a random number.

Accordingly, by this particular embodiment the message depends on both i and a random number, and the reply depends on the database contents and the respective query.

A Simple Scheme For $\log_2 n+1$ Databases

Supposing that n=2, the set $[n] = \{0,1\}^s$ is associated with the set of functions from [s] to $\{0,1\}$. Thus $j \in [n]$ is associated with the function $j:[s] \rightarrow \{0,1\}$ so that, for every l=1, 2, . . . ,s, the value j(l) is the l-th least significant bit in the binary expansion of j. Let $\delta_{i,j}$ be the Kronecker function:

$$\delta_{ij} \triangleq \begin{cases} 1 & \text{if } i = j \\ 0 & \text{otherwise} \end{cases}$$

The scheme of interest allows U to retrieve the $i^{th}$ bit of $x=x_1 \ldots x_n \in \{0,1\}^n$ using s+1 databases. There follows a definition of a sequence of functions constructed with the value of i in mind.

Let GF(q) be a finite field with at least s+2 elements. For notational simplicity, we denote the q elements of GF(q) by 0, 1, . . . , q-1. Whenever adding or multiplying field elements it is understood that these operations are the field's operations. Consider a polynomial in the variable z, defined over GF(q), of the following form:

$$F^{i,x}(z) = \sum_{j \in [n]} f_j^i(z) \cdot x_j$$

where:
P1 the $f_j^i$'s are polynomials (in z) of degree at most s; and
P2 $f_j^i(0) = \delta_{j,i}$ for each $j \in [n]$.
By (P2), $F^{i,x}(0) = \sum_{j \in [n]} f_j^i(0) \cdot x_j = \sum_{j \in [n]} \delta_{j,i} x_j = x_i$. On the other hand, by (P1), $F^{i,x}$ is a polynomial of degree at most s (in z). Thus, if U is given the value of $F^{i,x}(\cdot)$ at s+1 points, it can easily retrieve $F^{i,x}(0)$ by interpolation. So if U can obtain from each $DB_p$ (p=1,2, . . . , s+1) the value of F at point $p \neq 0$, without yielding information about i, then we are done. There follows a description of a scheme which achieves this goal at low cost.

The user selects uniformly and independently s elements in the field GF(q), denoted by $r_1, \ldots, r_s$, (the random number) and defines s functions $$g_l(z) \triangleq r_l z + i(l) \text{ for } l=1,2,\ldots,s.$$

For every $j \in [n]$ and $l \in [s]$ we define the degree 1 polynomial $$f_{j,l}^i(z) \triangleq j(l) \cdot g_l(z) + (1-j(l)) \cdot (1-g_l(z)).$$

The polynomial $f_j^i(z)$ is now defined as the product of the $f_{j,l}^i(z)$'s namely $$f_j^i(z) = f_{j,1}^i(z) \cdot f_{j,2}^i(z) \cdot \ldots \cdot f_{j,s}^i(z).$$

The user sends the values $g_1(p), \ldots, g_s(p)$ (that depends on i, the random number and the database index) to $DB_p$ (for p=1, 2, . . . , s+1). $DB_p$ uses these s values to compute $F^{i,x}(p)$ even though it does not know i, as follows. First, for every j and l ($1 \leq j \leq n$, $1 \leq l \leq s$), $DB_p$ computes the value $f_{j,l}^i(p)$ by setting:

$$f_{j,l}^i(p) = \begin{cases} g_l(p) & \text{if } j(l) = 1 \\ (1 - g_l(p)) & \text{otherwise} \end{cases}$$

Now, for every $j \in [n]$, $DB_p$ computes $$f_j^i(p) = f_{j,1}^i(p) \cdot f_{j,2}^i(p) \cdot \ldots \cdot f_{j,s}^i(p)$$

and $$F^{i,x}(p) = \sum_{j=1}^{n} f_j^i(p) \cdot x_j.$$

This computation takes $O(s \cdot n)$ operations in GF(q). The value $F^{i,x}(p)$ (which depends on the DB contents X, the query and the DB index p) is sent to the user. This way, U obtains the value of the polynomial $F^{i,x}(z)$ at the s+1 points 1, 2, . . . , $\log_2 n + 1$. The user interpolates (i.e. the final calculation step) and obtains $F^{i,x}(0) = x_i$.

The proposed scheme provides privacy. This is because the values $g_1(p), \ldots, g_s(p)$ sent by U to $DB_p$ ($p \neq 0$) are uniformly and independently distributed in the field, regardless of i. To see that the scheme yields the correct answer it suffices to verify properties (P1) and (P2) above. By definition, each of the polynomials $f_j^i$ is a product of s linear polynomials, and thus property (P1) follows. Property (P2) holds since $f_{j,l}^i(Z) = j(l) \cdot g_l(z) + (1-j(l)) \cdot (1-g_l(z))$ and $g_l(0) = i(l)$, for each $l \in [s]$, and thus $$f_j^i(0) = \prod_{l=1}^{s} f_{j,l}^i(0)$$
$$= \prod_{l=1}^{s} (j(l) \cdot i(l) + (1-j(l)) \cdot (1-i(l)))$$
$$= \delta_{i,j}.$$

There follows an analysis of the communication complexity of the above scheme. The communication between the user and each database consists of s field elements sent from the user to the database and one field element sent in response. Thus, the total communication amounts to (s+1) (s+1)·$\log_2 q$, where q is the size of the finite field GF(q). This q must be at least s+2 (to accommodate s+1 non-zero points), and can always be found in the range [s+2, 2s]. Since s=$\log_2 n$, so with s+1=$\log_2 n + 1$ databases, the communication complexity is $(1+o(1)) \cdot \log_2^2 n \log_2 \log_2(2n)$.

The present invention has been described with a certain degree of particularity but it should be understood that various modifications and alteration may be made without departing from the scope or spirit of the invention as defined by the following claims:

We claim:

1. A method for retrieving at least one sought l-bit-long ($l \geq 1$) data item from a database whilst essentially assuring the user's privacy;

the database having k ($k \geq 2$) database copies designated as $DB0_0$–$DB_{k-1}$ having respective k indices 0 . . . k-1; each of said database copies includes a plurality of l-bit-long data items associated, each, with a unique database address;

the method comprising the following steps executed with respect to each one of said at least one sought l-bit-long data item:
(i) providing a database address of said sought l-bit-long data item;
(ii) generating k strings $S_0 \ldots S_{k-1}$, which when applied, each, to the respective databases $DB_0$ to $DB_{k-1}$, define in each one of them, a respective plurality of database addresses of a plurality of l-bit-long data items; the plurality of database addresses that is defined by each one of said $S_0 \ldots S_{k-1}$ containing a common subset and a complementary subset of database addresses; the respective complementary subsets of database addresses of $S_0$–$S_{k-1}$, being distinguishable, one with respect to the other, contingent upon the database address stipulated in step (i);
(iii) calculating for each database $DB_i$, from among said databases $DB_0 \ldots DB_{k-1}$, result$_i$ as a function of the plurality of l-bit-long data items of step (ii), giving rise to the generation of k results from $DB_0 \ldots DB_{k-1}$, respectively;
(iv) communicating the k results of (iii) to the user; and
(v) calculating the sought l-bit-long item as a function of said k results.

2. A method according to claim 1, wherein k' databases (k'<k) from among said k databases are real and having respective k' indices, and a remaining k-k' databases from among said k databases are emulated; the k' databases are selected such that their respective k' indices are capable of covering the k indices of said k databases by utilizing a covering code technique.

3. A method according to claims 2, wherein the bi-directional communication between the database and the user occurs in two or more rounds.

4. The method according to claim 1, wherein the respective database copies $DB_0$–$DB_{k-1}$ storing, each, n l-bit-long data items, and are further organized, each, in d dimensions ($d \geq 1$) each of which of size $n^{1/d}$.

5. The method according to claim 1 wherein the respective database copies $DB_0$ to $DB_{k-1}$ are storing, each, m different sub-units; every subunit stores n/m l-bit-long data items;

querying the databases copies as stipulated in said step (ii) with respect to a single subunit of n/m l-bit-long data items;

each database copy calculates m replies from its respective m subunits, each of said replies is calculated in compliance with said step (iii);

each database sends said m replies to the user; and applying the said calculation step (v) so as to retrieve at least m l-bit-long data items.

6. A method according to claim 1, wherein said string $S_0$ is generated in an essentially pseudo-random manner.

7. A method according to claim 1, wherein said string $S_0$ is generated in a random manner.

8. The method according to claim 1, wherein said result$_i$ being l-bit-long and is obtained by xoring bit-by-bit the plurality of l-bit-long data items that are defined by the respective plurality of database addresses applied to said $DB_i$, as stipulated in said step (ii), and wherein the sought data item is obtained by xoring bit-by-bit said k l-bit-long results.

9. A method according to claims 1, wherein the bi-directional communication between the database and the user occurs in two or more rounds.

10. A method for retrieving at least one sought l-bit-long ($l \geq 1$) data item from a database whilst essentially assuring the user's privacy; the database having k ($k \geq 2$) database copies designated as $DB_0$–$DB_{k-1}$ having respective k indices 0 . . . k-1; each of said database copies includes a plurality of l-bit-long data items associated, each, with a unique database address; each one of said database copies is organized in d dimensions ($d \geq 1$) such that $2^d = k$ and wherein each l-bit-long data item, stored therein, is associated with a database address of d indices ($index_1, \ldots index_d$);

the method comprising the following steps executed with respect to each one of said at least one sought l-bit-long data item:

(i) providing a d-indices ($i_1, \ldots i_d$) database address of said sought data item;

(ii) generating a string of d substrings $S_1^0, \ldots S_d^0$ holding respectively a $1^{st}$ to $d^{th}$ sets of indices; said $1^{st}$ to $d^{th}$ sets of indices, when applied to said $DB_0$, defining a plurality of database addresses of respective plurality of l-bit-long data items stored therein;

(iii) generating k-1 different strings having, respectively, string numbers 1 to k-1, wherein each string having d substrings $S_1^{\sigma 1}, \ldots s_d^{\sigma d}$, such that $\sigma 1, \ldots \sigma d$ being a d-bit representation of the string number i of said string (i=1 . . . k-1); said d substrings $S_1^{\sigma 1}, \ldots S_d^{\sigma d}$, of each string having string number i (i=1 . . . k-1) holding, respectively, a $1^{st}$ to $d^{th}$ sets of indices that when applied to $DB_i$, having the same index i (i=1 . . . k-1), define a plurality of database addresses of respective plurality of l-bit-long data items stored in said $DB_i$; each substring $S_j^{\sigma j}$ from among said d substrings $S_1^{\sigma 1}, \ldots S_d^{\sigma d}$ (j=1 . . . d), has a value of either $S_j^0$ ($\sigma_j = 0$) or $S_j^1$ ($\sigma_j = 1$), wherein the former being the same as $S_j^0$ from among said $S_1^0, \ldots S_d^0$ stipulated in step (ii), and the latter ($S_j^1$) equals to $S_j^0 \oplus i_j$, wherein $i_j$ being an $j^{th}$ index taken from the indices ($i_1, \ldots i_d$) of the database address stipulated in step (i);

(iv) for each database $DB_i$, from among said databases $DB_0$ to $DB_{k-1}$, xoring, bit-by-bit the plurality of l-bit-long data items that are defined by the like number of plurality of database addresses applied to said $DB_i$, as stipulated in said step (iii), so as to yield l-bit-long result$_i$, giving rise to the generation of k l-bit-long results from $DB_0$ to $DB_{k-1}$, respectively;

(v) communicating the k l-bit-long results to the user; and (vi) the user xoring bit-by-bit said k l-bit-long results thereby deriving said sought data item.

11. The method according to claim 10, wherein the respective database copies $DB_0$ to $DB_{k-1}$ are storing, each, m different sub-units; every subunit stores n/m l-bit-long data items;

querying the databases copies as stipulated in said steps (ii) and (iii) with respect to a single subunit of n/m l-bit-long data items;

each database copy calculates m replies from its respective m subunits, each of said replies is calculated in compliance with said step (iv);

each database sends said m replies to the user; and applying the said calculation step (vi) so as to retrieve at least m l-bit-long data items.

12. A method according to claim 11, wherein k=2, d=1, $m = n^{1/2}$ and l=m.

13. A method according to claim 11, wherein k=4, d=2, $m = n^{1/3}$ and l=m.

14. A method according to claims 10, wherein the bi-directional communication between the database and the user occurs in two or more rounds.

15. A method for retrieving at least one sought l-bit-long data item from a database whilst essentially assuring the user's privacy; the database having k ($k \geq 2$) database copies designated as $DB0_0$–$DB_{k-1}$ having respective k indices 0 . . . k-1; each of said database copies includes a plurality of l-bit-long data items associated, each, with a unique database address; each one of said database copies is organized in d dimensions ($d \geq 1$) such that $2^d = k$ and wherein each l-bit-long data item, stored therein, is associated with a database address of d indices ($index_1, \ldots index_d$); k'(k'<k) database copies ($DB_{i_0}, \ldots, DB_{i_{k'-1}}$), from among said k database copies, being real and are further having respective indices numbers $i_0 \ldots i_{k'-1}$; the indices numbers $i_0 \ldots i_{k'-1}$ taken from the numbers 0 to k-1; the indices numbers $i_0 \ldots i_{k'-1}$, form collectively k' codewords for covering k indices 0 . . . k-1, of d-bits each, with Hamming distance 1, thereby enabling ($DB_{i_0}, \ldots, DB_{i_{k'-1}}$) to emulate the remaining k-k' database copies, from among said $DB_0$ to $DB_{k-1}$;

the method comprising the following steps executed with respect to each one of said at least one sought l-bit-long data item:

(i) providing a d-indices ($i_1, \ldots i_d$) database address of said sought data item;

(ii) generating a string of d substrings $S_1^{\sigma 1'}, \ldots S_d^{\sigma d'}$ holding respectively a $1^{st}$ to $d^{th}$ sets of indices; said $1^{st}$ to $d^{th}$ sets of indices, when applied to said $DB_{i_0}$, defining a plurality of database addresses of l-bit-long data items stored therein; $\sigma 1', \ldots \sigma d'$ being a d-bit representation of the string number $i_0$;

(iii) generating k'-1 (k'<k) different strings having, respectively, string numbers $i_1$ to $i_{k'-1}$ being identical to said indices numbers $i_1$ to $i_{k'-1}$, wherein each string having d substrings $S_1^{o1}, \ldots S_d^{od}$, such that $o1, \ldots od$ being a d-bit representation of the string number $i_j$ of said string ($i_j = i_1 \ldots i_{k-1}$); said d substrings $S_1^{o1}, \ldots S_d^{od}$, of each string having string number $i_j(i_j=i_1\ldots,i_{k-1})$, holding respectively a $1^{st}$ to $d^{th}$ sets of indices that when applied to $DB_{i_j}$, having the same index i (i=1 ... k-1), define a plurality of database addresses of data items stored in said $DB_{i_j}$; each substring $S_j^{oj}$ from among said d substrings $S_1^{o1}, \ldots S_d^{od}$ (j=1 ... d), has a value of either $S_j^{oj'}(\sigma_j=\sigma_{j'})$ or $S_j^{oj'}(\sigma_j \neq \sigma_{j'})$, wherein the former being the same as $S_j^{oj'}$ from among said $S_j^{o1'}, \ldots S_d^{od'}$ stipulated in step (ii), and the latter $(S_j^{oj'})$ being equal to $S_j^{oj} \oplus i_{j'}$ wherein $i_j$ being an $j^{th}$ index taken from the d indices $(i_1, \ldots i_d)$ of the database address stipulated in step (i);

(iv) each database $DB_{i_1}$ from among said databases $DB_{i_0} \ldots DB_{i_{k-1}}$, xoring bit-by-bit the plurality of l-bit-long data items that are defined by the like number of plurality of database addresses applied to said $DB_{i_j}$, as stipulated in said step (iii), so as to yield l-bit-long result$_j$; giving rise to the generation of k' l-bit-long results from $DB_{i_0} \ldots DB_{i_{k-1}}$, respectively;

(v) communicating the k' l-bit-long results of (iv) to the user;

(vi) each one of the k' databases $DB_{i_0} \ldots DB_{i_{k-1}}$ emulating the reply of every database $DB_j$, from among said emulated databases, such that the index j thereof is of Hamming distance 1 with respect to the index of said one database; the reply of each emulated database $DB_j$, including repeatedly executing $n^{1/d}$ times said step (iv), each time with respect to a different database address, thereby generating $n^{1/d}$ l-bit-long results with respect to said $DB_j$; giving rise to the generation of $n^{1/d}$ l-bit-long results with respect to each one of the k-k' emulated databases;

(vii) communicating the k' l-bit-long results of (vi) to the user;

(viii) for each one of said emulated k-k' $DB_j$, the user selecting the correct l-bit-long result, from among said $n^{1/d}$ l-bit-long results, thereby obtaining k-k' l-bit-long results, which together with the k' l-bit-long results, stipulated in said step (iv), constitute k l-bit-long results; and (ix) the user xoring bit-by-bit said k l-bit-long results thereby deriving the sought data item.

16. A method for retrieving at least one sought data item from a database whilst essentially assuring the user's privacy;

the database having k (k≧2) database copies designated as $DB_0–DB_{k-1}$ having respective k indices 0 ... k-1;

the method comprising the following steps executed with respect to each one of said at least one sought data item:

(i) the providing a database address of the sought l-bit-long data item;

(ii) the user generating at least two messages and communicating the messages to respective at least two database copies from among said $DB_0–DB_{k-1}$;

(iii) the at least two database copies generating at least two respective replies, and communicating the at least two replies to;

wherein:

at least one of said messages depends on at least the following parameters (a) and (b):

(a) the database address stipulated in step (i), and (b) a pseudo random or random number; and at least one of said messages depends on at least (c) a pseudo random or random number; and wherein:

each reply, from among said at least two replies, that is communicated from the respective database copy depends at least on the message communicated to said at respective database copy; and (iv) calculating the sought data item as a function of at least:

(d) the at least two respective replies stipulated in said step (iii).

17. The method according to claim 16, wherein the respective database copies $DB_0$ to $DB_{k-1}$ are storing, each, m different sub-units; every subunit stores n/m l-bit-long data items;

querying the databases copies as stipulated in said step (ii) with respect to a single subunit of n/m l-bit-long data items;

each database copy calculates m replies from its respective m subunits, each of said replies is calculated in compliance with said step (iii);

each database sends said m replies to the user; and applying the said calculation step (iv) so as to retrieve at least m l-bit-long data items, and wherein said steps (ii) and (iii) involve only one round.

18. A system for retrieving at least one sought l-bit-long (l≧1) data item from a database whilst essentially assuring the user's privacy; the database having k (k≧2) database copies designated as $DB0_0–DB_{k-1}$ having respective k indices 0 ... k-1; each of said database copies includes a plurality of l-bit-long data items associated, each, with a unique database address;

the system comprising a user station, linked to a communication channel, which includes in combination:

(i) storage medium for storing a database address of said sought l-bit-long data item;

(ii) string generator for generating k strings $S_0 \ldots S_{k-1}$, which when communicated and applied to databases copies $DB_0$ to $DB_{k-1}$, respectively, define in each one of them, a plurality of database addresses of a plurality of l-bit-long data items; the plurality of database addresses that is defined by each one of said $S_0 \ldots S_{k-1}$ containing a common subset and a complementary subset of database addresses; the respective complementary subsets of database addresses of $S_0–S_{k-1}$, being distinguishable, one with respect to the other, contingent upon the database address associated with said data item;

the system further comprising database processor that includes:

(i) calculator associated with each database $DB_i$, from among said databases $DB_0 \ldots DB_{k-1}$, for calculating a respective result$_i$ as a function of the plurality of said l-bit-long data items; said calculator is further capable of communicating k results from $DB_0 \ldots DB_{k-1}$, respectively; and in the user station, receiver for receiving said k results, and user calculator means associated with said receiver, for calculating the sought l-bit-long item as the function of said k results.

* * * * *

UNITED STATES PATENT AND TRADEMARK OFFICE
CERTIFICATE OF CORRECTION

PATENT NO. : 5,855,018
DATED : December 29, 1998
INVENTOR(S) : Ben-Zion Chor, Oded Goldreich, Eyal Kushilevitz It is certified that error appears in the above-identified patent and that said Letters Patent is hereby corrected as shown below:

<u>Column 26,</u>
Line 2, after "from the" insert -- d --, after "$i_1$" delete ","
Line 11, after "results" delete "to the user"

<u>Column 27,</u>
Line 39, delete "the user"
Line 45, delete "the user"
Line 55, after "(i)" delete "the" (first occurrence)
Line 57, after "(ii)" delete "the user"

Signed and Sealed this

Twenty-fifth Day of September, 2001

*Attest:*

NICHOLAS P. GODICI
*Attesting Officer*     *Acting Director of the United States Patent and Trademark Office*